United States Patent
Thompson

(10) Patent No.: US 10,137,977 B2
(45) Date of Patent: *Nov. 27, 2018

(54) ARRANGEMENT FOR EFFECTING MOVEMENT OF A WING TIP DEVICE BETWEEN A FLIGHT CONFIGURATION AND A GROUND CONFIGURATION

(71) Applicant: AIRBUS OPERATIONS LIMITED, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 345 days.

This patent is subject to a terminal disclaimer.

(21) Appl. No.: 15/045,311

(22) Filed: Feb. 17, 2016

(65) Prior Publication Data

US 2016/0244145 A1    Aug. 25, 2016

(30) Foreign Application Priority Data

Feb. 17, 2015   (GB) ..................................... 1502661

(51) Int. Cl.
   *B64C 3/56*    (2006.01)
   *B64C 23/06*   (2006.01)

(52) U.S. Cl.
   CPC .............. *B64C 3/56* (2013.01); *B64C 23/072* (2017.05); *Y02T 50/164* (2013.01)

(58) Field of Classification Search
   CPC ........... B64C 23/072; B64C 3/56; B64C 3/42; B64C 23/065; B64C 3/00; Y02T 50/164; Y02T 50/145
   See application file for complete search history.

(56) References Cited

U.S. PATENT DOCUMENTS 2,397,526 A * 4/1946 Bonbright ........... B64C 29/0025
                                                 244/12.1
2,420,433 A * 5/1947 Kraaymes ................. B64C 3/54
                                                 244/218
(Continued)

FOREIGN PATENT DOCUMENTS

EP        0210399 A2    2/1987
EP        2727830 A2    5/2014
(Continued)

OTHER PUBLICATIONS

Search Report dated Jun. 29, 2016 in European Application No. 16155939.

(Continued)

*Primary Examiner* — Medhat Badawi
(74) *Attorney, Agent, or Firm* — Nixon & Vanderhye, PC

(57) ABSTRACT

An aircraft comprises a wing, a wing tip device at the tip of the wing and an actuator. The actuator is arranged to effect movement of the wing tip device between a flight configuration for use during flight and a ground configuration in which the wing tip device is moved away from the flight configuration such that the span of the aircraft is reduced. The aircraft comprises a carriage guide, such as a track assembly, fixed relative to the wing, and a carriage arranged to move along the track assembly as the wing tip device moves between the flight and ground configurations. The carriage carries the wing tip device on a pivot, such that the wing tip device is rotatable relative to the carriage, about the pivot, as the carriage moves along the track assembly. The movement of the wing tip device between the flight and the ground configurations, may thereby comprise both a rotational component of movement of the wing tip device about the pivot, and a translational component of movement, of the pivot, along the track assembly.

9 Claims, 22 Drawing Sheets

(56) References Cited

U.S. PATENT DOCUMENTS

| | | | | |
|---|---|---|---|---|
| 3,666,210 A * | 5/1972 | Look | B64C 3/56 | 244/218 |
| 3,785,594 A * | 1/1974 | Lee | B64C 9/16 | 244/216 |
| 3,974,986 A * | 8/1976 | Johnstone | B64C 23/06 | 244/130 |
| 4,698,041 A * | 10/1987 | Dasa | A63H 27/00 | 446/61 |
| 4,725,026 A * | 2/1988 | Krafka | B64C 9/16 | 244/213 |
| D304,821 S * | 11/1989 | Ratony | D12/319 | |
| 4,998,689 A * | 3/1991 | Woodcock | B64C 3/38 | 244/201 |
| 5,201,479 A * | 4/1993 | Renzelmann | B64C 3/56 | 244/49 |
| 5,310,138 A * | 5/1994 | Fitzgibbon | B64C 3/56 | 244/49 |
| 5,350,135 A * | 9/1994 | Renzelmann | B64C 3/56 | 244/49 |
| 5,372,336 A * | 12/1994 | Paez | B64C 3/56 | 244/130 |
| 5,381,986 A * | 1/1995 | Smith | B64C 3/56 | 244/49 |
| 5,427,329 A * | 6/1995 | Renzelmann | B64C 3/56 | 244/49 |
| 5,538,202 A * | 7/1996 | Thornburg | B64C 13/36 | 244/215 |
| 5,558,299 A * | 9/1996 | Veile | B64C 3/56 | 244/131 |
| 5,785,282 A * | 7/1998 | Wake | B64C 27/463 | 244/130 |
| 6,076,766 A * | 6/2000 | Gruensfelder | B64C 3/56 | 244/130 |
| 6,173,924 B1 * | 1/2001 | Young | B64C 3/48 | 244/215 |
| 7,150,434 B1 * | 12/2006 | Bandyopadhyay | B64C 23/06 | 244/130 |
| 8,651,431 B1 * | 2/2014 | White | B64C 23/076 | 244/218 |
| 8,708,286 B2 * | 4/2014 | Sakurai | B64C 3/56 | 244/201 |
| 8,757,538 B2 * | 6/2014 | Seifert | B64C 3/10 | 244/45 R |
| 9,096,304 B2 * | 8/2015 | Parker | B64C 5/08 | |
| 9,290,260 B2 * | 3/2016 | Lassen | B64C 3/56 | |
| 9,296,471 B2 * | 3/2016 | Sakurai | B64C 9/00 | |
| 9,469,392 B2 * | 10/2016 | Fox | B64C 23/072 | |
| 9,499,252 B2 * | 11/2016 | Lassen | B64C 3/56 | |
| 9,764,825 B2 * | 9/2017 | Guida | B64C 23/065 | |
| 9,868,517 B2 * | 1/2018 | McMahon | B64C 23/065 | |
| 9,889,920 B2 * | 2/2018 | Harding | B64C 3/56 | |
| 9,896,186 B2 * | 2/2018 | Fong | B64C 3/185 | |
| 2002/0066831 A1 * | 6/2002 | Ngo | B64C 27/463 | 244/199.3 |
| 2005/0133672 A1 | 6/2005 | Irving et al. | | |
| 2008/0042013 A1 * | 2/2008 | Shmilovich | B64C 23/065 | 244/199.4 |
| 2009/0173835 A1 * | 7/2009 | Shmilovich | B64C 23/065 | 244/199.3 |
| 2011/0001016 A1 * | 1/2011 | Skillen | B64C 3/40 | 244/218 |
| 2012/0228424 A1 * | 9/2012 | Parker | B64C 3/56 | 244/49 |
| 2013/0001367 A1 * | 1/2013 | Boer | B64C 23/065 | 244/199.3 |
| 2013/0056579 A1 * | 3/2013 | Schlipf | B64C 3/56 | 244/49 |
| 2013/0099060 A1 * | 4/2013 | Dees | B64C 3/56 | 244/199.4 |
| 2013/0292508 A1 * | 11/2013 | Fox | B64C 3/56 | 244/49 |
| 2013/0313356 A1 * | 11/2013 | Santini | B64C 3/56 | 244/49 |
| 2014/0061371 A1 * | 3/2014 | Good | B64C 3/56 | 244/49 |
| 2014/0117150 A1 | 5/2014 | Good et al. | | |
| 2014/0117151 A1 * | 5/2014 | Fox | B64C 3/56 | 244/49 |
| 2014/0175217 A1 * | 6/2014 | Ishihara | B64C 9/16 | 244/99.3 |
| 2016/0090170 A1 * | 3/2016 | Thompson | B64D 45/0005 | 701/3 |
| 2016/0244145 A1 * | 8/2016 | Thompson | B64C 3/56 | |
| 2016/0251075 A1 * | 9/2016 | Thompson | B64C 3/56 | 244/198 |
| 2016/0272297 A1 * | 9/2016 | Thompson | B64C 3/26 | |
| 2017/0029094 A1 * | 2/2017 | Lynas | B64C 3/546 | |
| 2017/0152015 A1 * | 6/2017 | Wilson | B64C 3/56 | |
| 2017/0355436 A1 * | 12/2017 | Thompson | B64C 3/56 | |
| 2017/0369151 A1 * | 12/2017 | Thompson | B64C 3/56 | |

FOREIGN PATENT DOCUMENTS

| | | |
|---|---|---|
| GB | 450276 A | 7/1936 |
| GB | 475500 A | 11/1937 |
| WO | 2011051699 A2 | 5/2011 |

OTHER PUBLICATIONS

Search Report dated Jul. 16, 2015 in Great Britain Application No. 1502661.0.

* cited by examiner

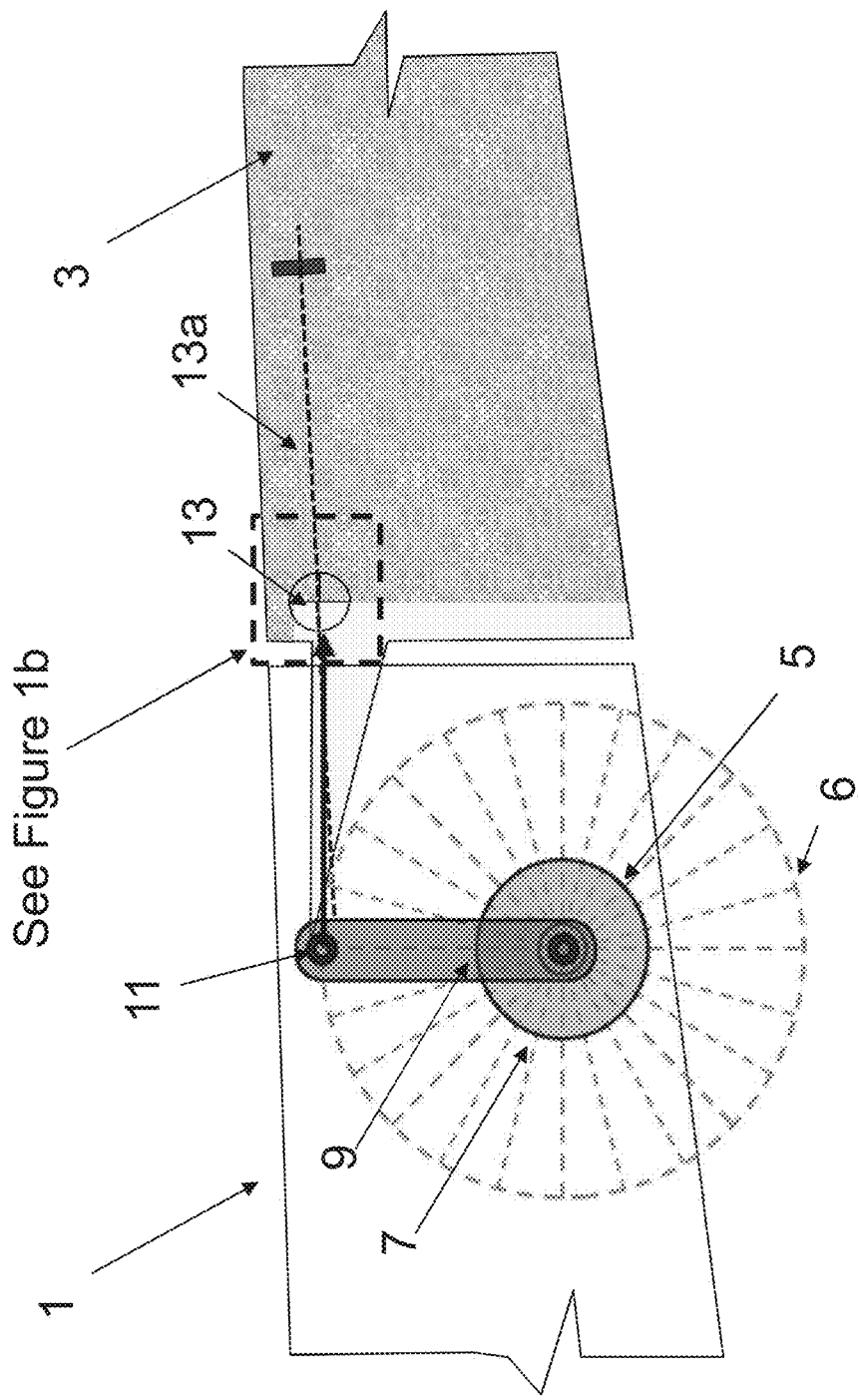

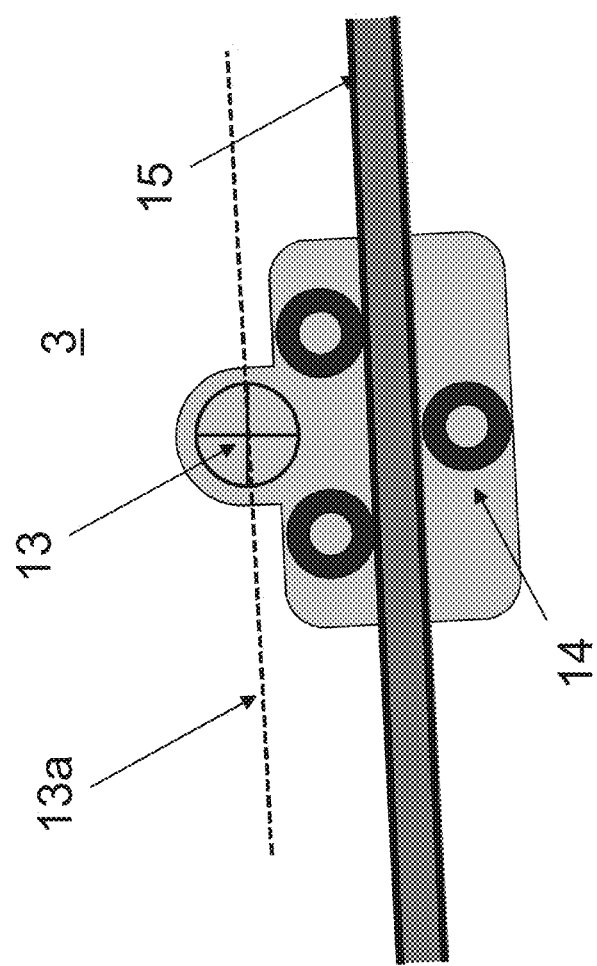

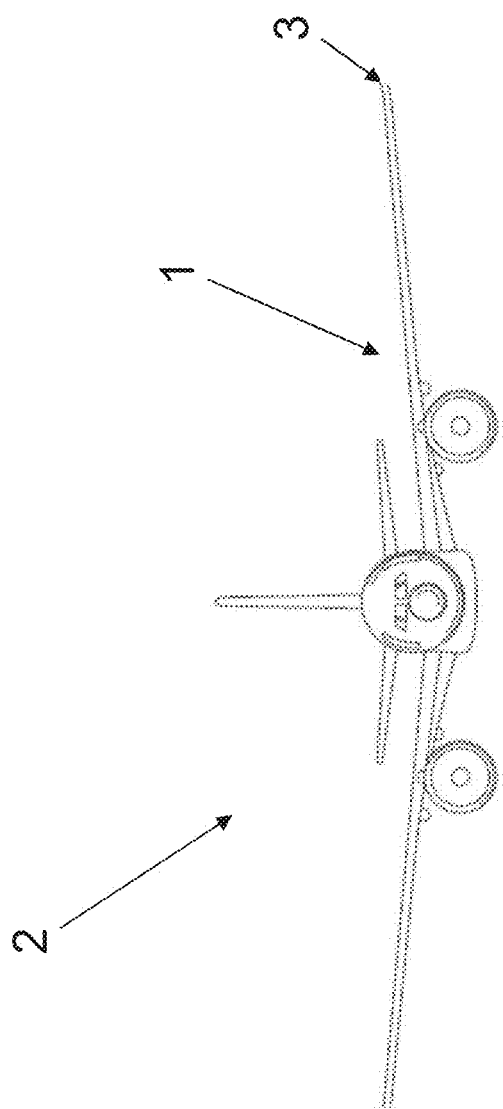

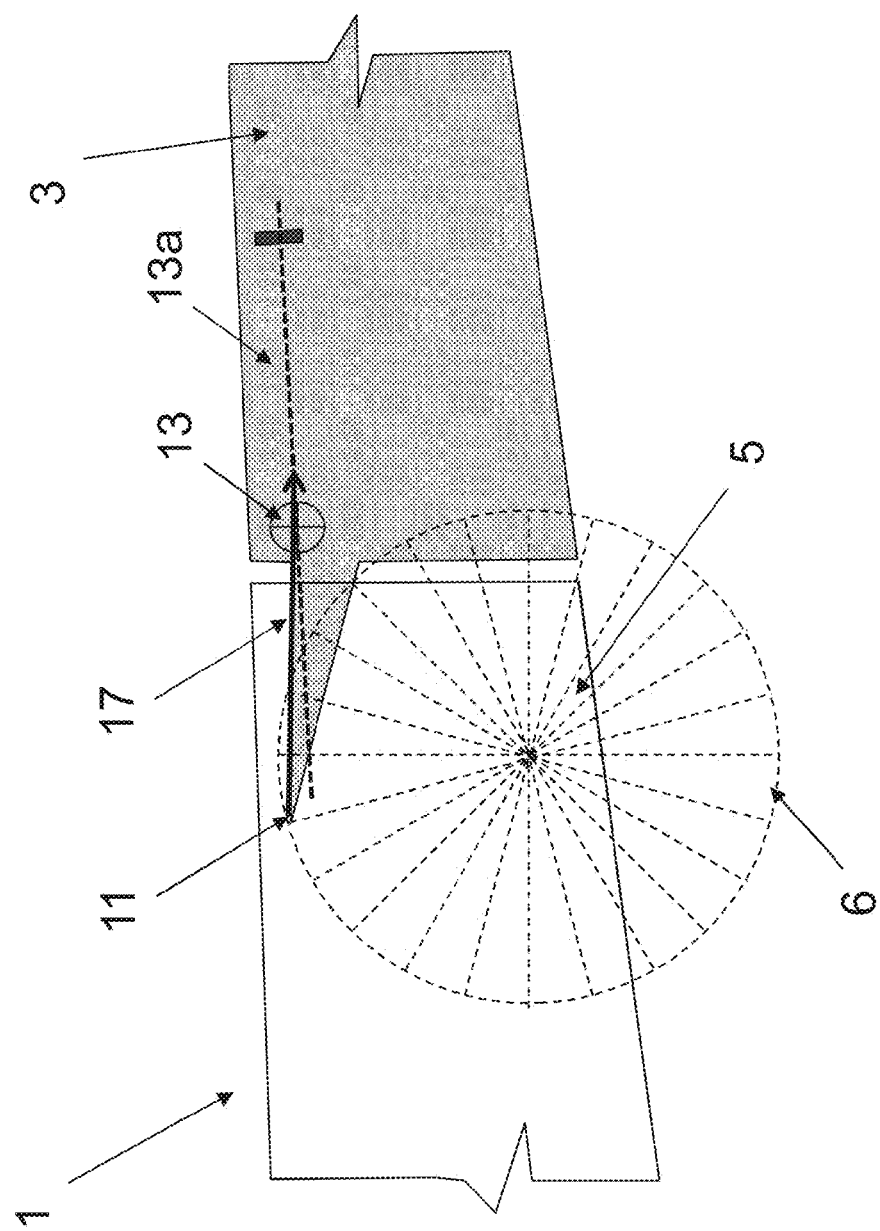

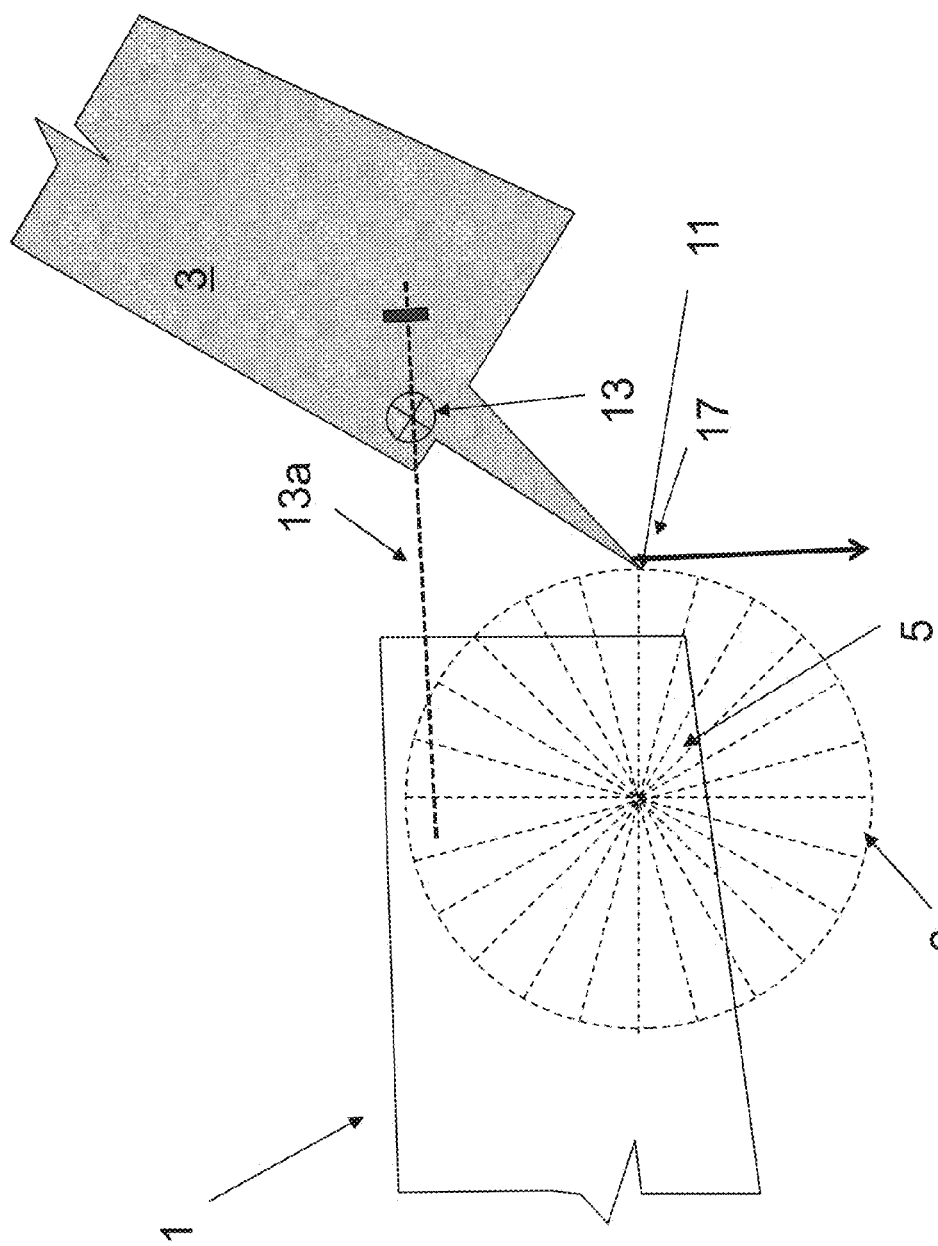

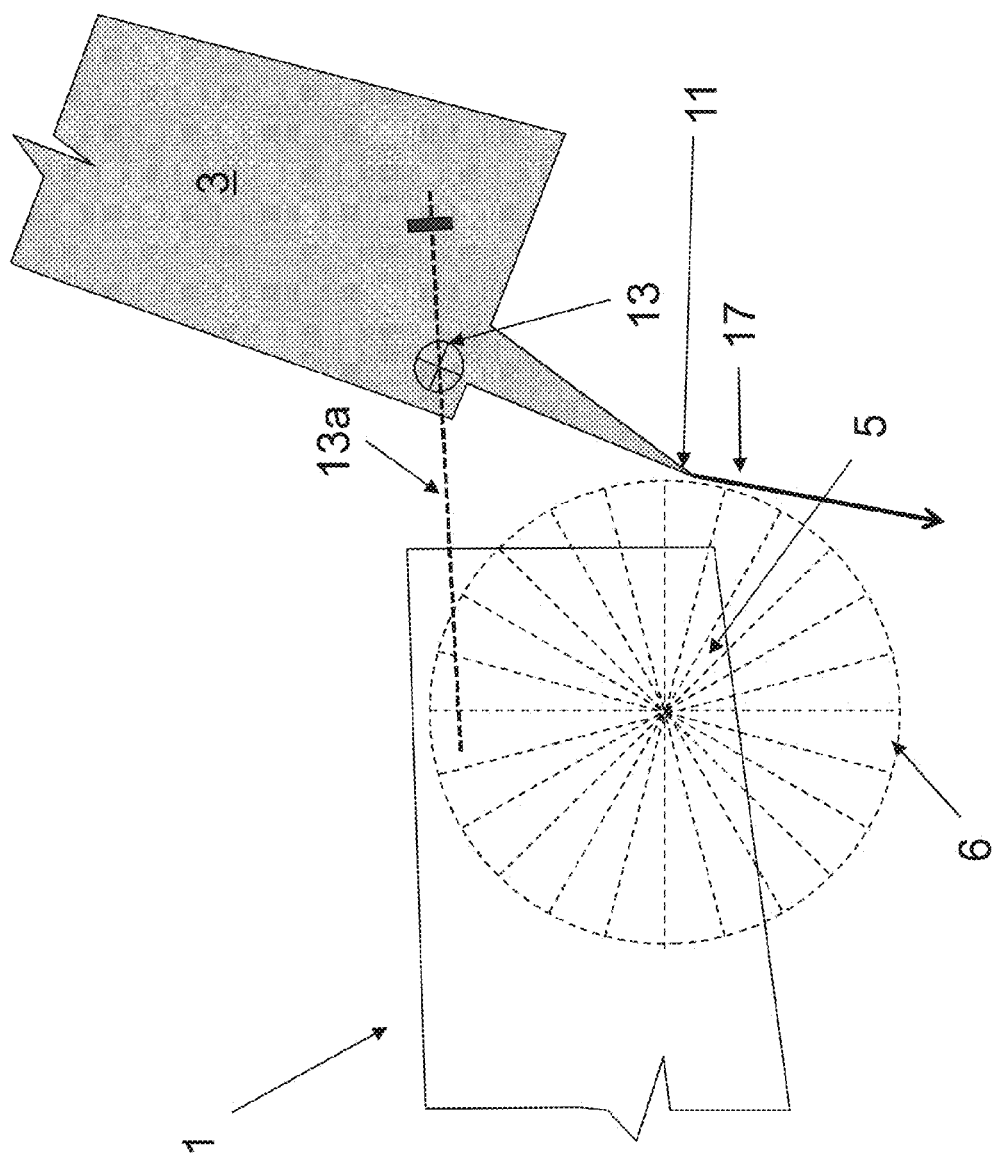

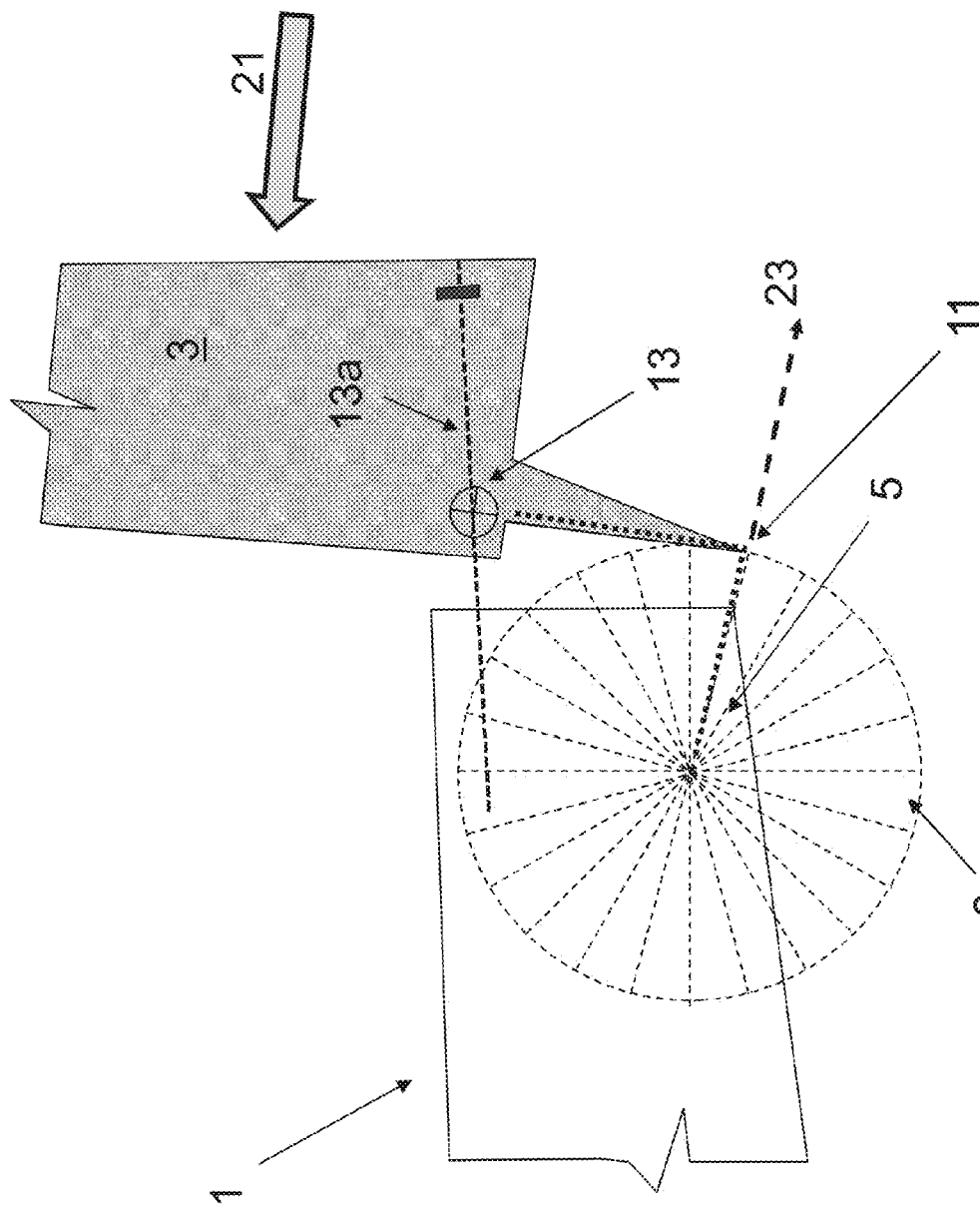

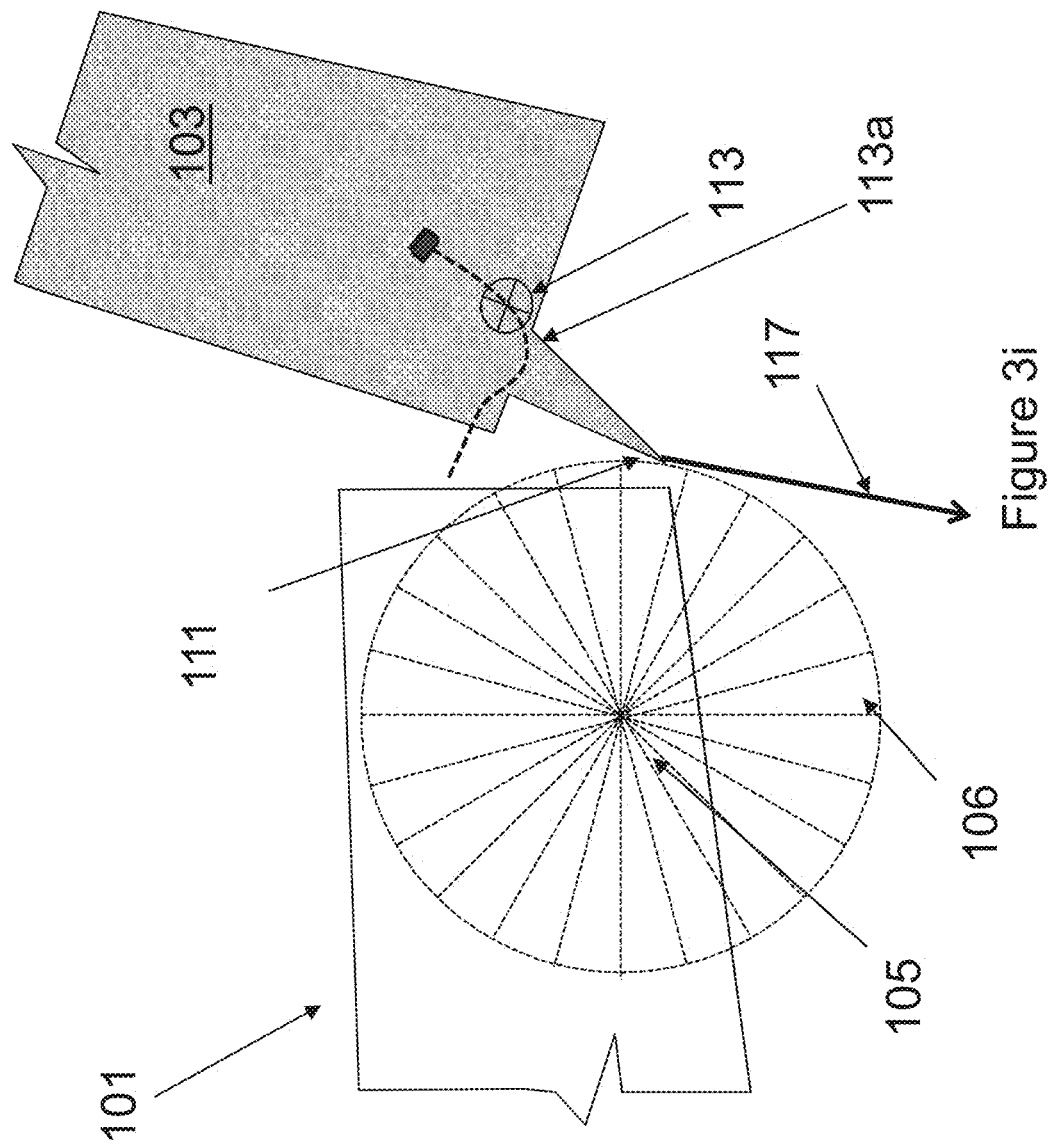

ARRANGEMENT FOR EFFECTING MOVEMENT OF A WING TIP DEVICE BETWEEN A FLIGHT CONFIGURATION AND A GROUND CONFIGURATION

RELATED APPLICATIONS

The present application claims priority from Great Britain Application Number 1502661.0, filed Feb. 17, 2015, the disclosure of which is hereby incorporated by reference herein in its entirety.

BACKGROUND OF THE INVENTION

The present invention relates to aircraft and more specifically, but not exclusively, to passenger aircraft with wing tip devices.

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs, aircraft are provided with wing tip devices which may be folded to reduce the span of the aircraft on the ground (compared to when the aircraft is configured for flight). The wing tip devices may, for example, be configurable between: (i) a flight configuration for use during flight and (ii) a ground configuration for use during ground-based operations, in which ground configuration the wing tip device is moved away from the flight configuration such that the span of the aircraft is reduced.

It may be desirable for the movement between the flight and the ground configurations to comprise both a rotational component of movement of the wing tip device, and a translational component of movement of the wing tip device relative to the wing. The rotational movement typically allows the wing tip device to be rotated upwards or downwards to reduce the span of the aircraft, whereas the translational component may, for example, enable the wing tip device to disengage from a locking arrangement.

There are technical challenges in providing a practical arrangement for providing such movement. Amongst the issues to be addressed are: the problem of providing a safe and reliable arrangement to enable such movement without impacting unduly on the design of the wing; and the problem of providing a compact and lightweight drive to effect the movement of the wing tip device. The present invention seeks to mitigate at least some of the above-mentioned problems.

SUMMARY OF THE INVENTION

According to a first aspect of the invention, there is provided an aircraft comprising a wing, a wing tip device at the tip of the wing and an actuator, the actuator being arranged to effect movement of the wing tip device between: (i) a flight configuration for use during flight and (ii) a ground configuration for use during ground-based operations, in which ground configuration the wing tip device is moved away from the flight configuration such that the span of the aircraft is reduced, characterised in that the aircraft comprises: a carriage guide, fixed relative to the wing, and a carriage arranged to move along the carriage guide as the wing tip device moves between the flight and ground configurations, wherein the carriage carries the wing tip device on a pivot, such that the wing tip device is rotatable relative to the carriage, about the pivot, as the carriage moves along the carriage guide, the movement of the wing tip device, between the flight and the ground configurations, thereby comprising both a rotational component of movement of the wing tip device about the pivot, and a translational component of movement, of the pivot, along the carriage guide.

Providing a carriage guide and an associated carriage for carrying the pivot of the wing tip device, has been found to be an especially effective arrangement for enabling both rotary movement, and translational movement, of the wing tip device. For example, since the wing tip device is rotatable (about the pivot) relative to the carriage, the movement of the wing tip device is able to be controlled in dependence on the relative positions of the pivot and an actuation force vector, as the carriage moves along the carriage guide.

The actuator may be coupled to the wing tip device at a coupling between the actuator and the wing tip device. The coupling may be referred to as an actuated location on the wing tip device. The actuator may be arranged such that the coupling, during movement of the wing tip device between the flight configuration and the ground configuration, follows a curved, and more preferably a substantially arcuate, locus. In some embodiments of the invention, the actuator may be a rotary actuator. In some other embodiments of the invention, the actuator need not be a rotary actuator but may nevertheless be arranged to effect arcuate motion of the coupling. For example, the actuator may comprise a linear actuator and a linkage mechanism, such as a rotating link. The arcuate locus preferably has a constant radius. Having the coupling follow a substantially arcuate locus may be particularly advantageous as it may result in a relatively simple and reliable actuation arrangement.

Providing the carriage guide and the carriage as described herein has been found to be especially advantageous when used in combination with the actuator that results in the coupling follow a substantially arcuate locus. The relative positions of the pivot and the coupling, as the wing tip device moves along the carriage guide between the flight and the ground configurations, may be arranged such that the movement of the wing tip device comprises the translational component and the rotational component, despite the coupling following a substantially arcuate locus. For example, if the net force from the actuator passes through the pivot, it tends to act to only translate the wing tip device, whereas if the net force of the actuator is off-set from the pivot, it tends to act to rotate the wing tip device. The relative positions of the pivot and net force vector, as the carriage moves along the carriage guide, can be selected to provide the desired movement of the wing tip device.

The carriage guide is arranged to guide the carriage. The carriage guide may take a number of forms. For example, the carriage guide may be a track assembly. The carriage guide may be in the form of a slot. It will be appreciated that different designs of carriage may be suitable for different types of carriage assembly.

When the wing tip device is in the ground configuration, the relative locations of the pivot and the coupling, are preferably such that when the wing tip device is urged to undergo a rotation about the pivot, from that ground configuration, the reaction force at the coupling is substantially radial with respect to the arcuate locus. This arrangement has been found to be especially beneficial because it ensures there is a minimal component of the reaction force in a tangential direction, and therefore a minimal force seeking to back-drive the actuator. The wing tip device tends to therefore be relatively stable in the ground configuration. Furthermore, the need for locking/braking the actuator is reduced.

The movement from the flight configuration to the ground configuration preferably comprises an initial phase of motion. The initial phase of motion preferably begins with the wing tip device in the flight configuration. The initial phase of motion preferably comprises only a translational component of movement of the wing tip device. The initial phase of motion preferably finishes before the wing tip device is in the ground configuration (for example it may finish with the wing tip device in an intermediate configuration). The initial phase of motion may be arranged to unlock the wing tip device from a locking system. For example, the wing tip device may be held on a series of spigots and the initial phase of motion may be arranged to translate the wing tip device along, and off, the spigots. Alternatively or additionally, the initial phase of motion may be arranged to translate the wing tip device away from the wing to unseal a sealing arrangement. For example there may be a sealing arrangement between the wing and the wing tip device in the flight configuration. A rotational component of movement of the wing tip device, and/or a sliding motion at the seal interface, may lead to premature wear of the sealing arrangement, whereas providing a translational movement of the wing tip device has been found to be more effective in preserving the life of the seal.

The actuator may apply an actuation-force vector. During the initial phase of motion the actuation-force vector and the pivot are preferably substantially inline such that the actuation force vector passes close to, and more preferably substantially through, the pivot. Such an arrangement has been found to be beneficial because it ensures the wing tip device does not experience an excessive and/or adverse turning moment, about the pivot, during the initial phase of motion. The force vector may instead, primarily urge the wing tip device to translate along the rail.

In some embodiments, the wing tip device may be constrained to prevent rotation during the initial phase of motion. For example, during the initial phase of motion, there may be a moment urging the wing tip device to rotate. The wing tip device may be constrained to prevent this rotation. Preferably, the force vector is sufficiently close to the pivot that the adverse moment is relatively small and can be reacted in the wing structure.

When the wing tip device is in the ground configuration, the height of the pivot is preferably at a local minimum. The local minimum is preferably such that movement of the carriage along the carriage guide, to move the wing tip device away from the ground configuration, will result in the lifting of the pivot. Such an arrangement has been found to be especially stable because any external forces urging the wing tip device away from the ground configuration (such as those generated by wind loadings on the wing tip device) will have to overcome (i.e. lift) the weight of the wing tip device to move it away from the ground configuration.

When the wing tip device is in the ground configuration, the stability of the wing tip may also be facilitated by other features. For example, the actuator may be non-back driveable. The carriage guide may be such that the wing tip device is held in a geometric lock when it is in the ground configuration.

In preferred embodiments of the invention the wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of the wing. The leading edge of the wing tip device is preferably a continuation of the leading edge of the wing. There is preferably a smooth transition from the wing to the wing tip device. It will be appreciated that there may be a smooth transition, even where there are changes in sweep or twist at the junction between the wing and wing tip device. However, there are preferably no discontinuities at the junction between the wing and wing tip device. The upper and the lower surfaces of the wing tip device may be continuations of the upper and lower surfaces of the wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

In the flight configuration, the span of the aircraft may exceed an airport compatibility gate limit. In the ground configuration the span of the aircraft is preferably reduced such that the span (with the wing tip device in the ground configuration) is less than, or substantially equal to, the airport compatibility gate limit.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to another aspect of the invention there is provided an assembly for attaching a wing tip device to an aircraft wing, the wing tip device being moveable between: (i) a flight configuration for use during flight and (ii) a ground configuration for use during ground-based operations, in which ground configuration the wing tip device is moved away from the flight configuration such that the span of the aircraft is reduced, wherein the assembly comprises: a carriage guide, for fixing relative to the wing, and a carriage arranged to move along the carriage guide as the wing tip device moves between the flight and ground configurations, wherein the carriage carries the wing tip device on a pivot, such that the wing tip device is rotatable relative to the carriage, about the pivot, as the carriage moves along the carriage guide.

According to another aspect of the invention there is provided a method of designing the path of movement of a wing tip device on the aircraft as described herein. The method comprises the steps of determining: (i) the radius of the arcuate locus, and/or (ii) the shape of the carriage guide and/or (iii) the relative positions of the pivot and the coupling, such that as the wing tip device moves along the carriage guide between the flight and the ground configurations, the movement of the wing tip device comprises a translational component of movement along the carriage guide, and rotational component about the pivot. By determining the appropriate radius, carriage guide shape, and/or relative positions of the pivot and coupling, the movement of the wing tip device may be controlled. For example, the relative locations of the pivot and coupling may determine the turning moment that the wing tip device is subjected to. The carriage guide shape may determine the path of the pivot.

According to another aspect of the invention, there is provided a method of moving a wing tip device between a flight configuration and a ground configuration, the wing tip device being pivotable on a carriage that is movable along a carriage guide, such that the wing tip device is rotatable relative to the carriage. The method comprises the step of: moving the carriage along the carriage guide, such that the movement of the wing tip device, between the flight and the ground configurations, comprises both a rotational component of movement of the wing tip device about the pivot, and a translational component of movement, of the pivot, along the carriage guide.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 1a shows a schematic side view of a wing and wing tip device according to a first embodiment of the invention;

FIG. 1b shows a close-up schematic view of the track and carriage in the embodiment of FIG. 1a;

FIG. 1c shows a front view of the aircraft with the wing and wing tip device of FIG. 1a;

FIGS. 2a to 2i are schematic side views of the wing and wing tip device of FIG. 1a during movement from the flight configuration to the ground configuration; and FIGS. 3a to 3j are schematic side views of the wing and wing tip device according to a second embodiment of the invention, during movement from the flight configuration to the ground configuration.

DETAILED DESCRIPTION

Figure 2B:
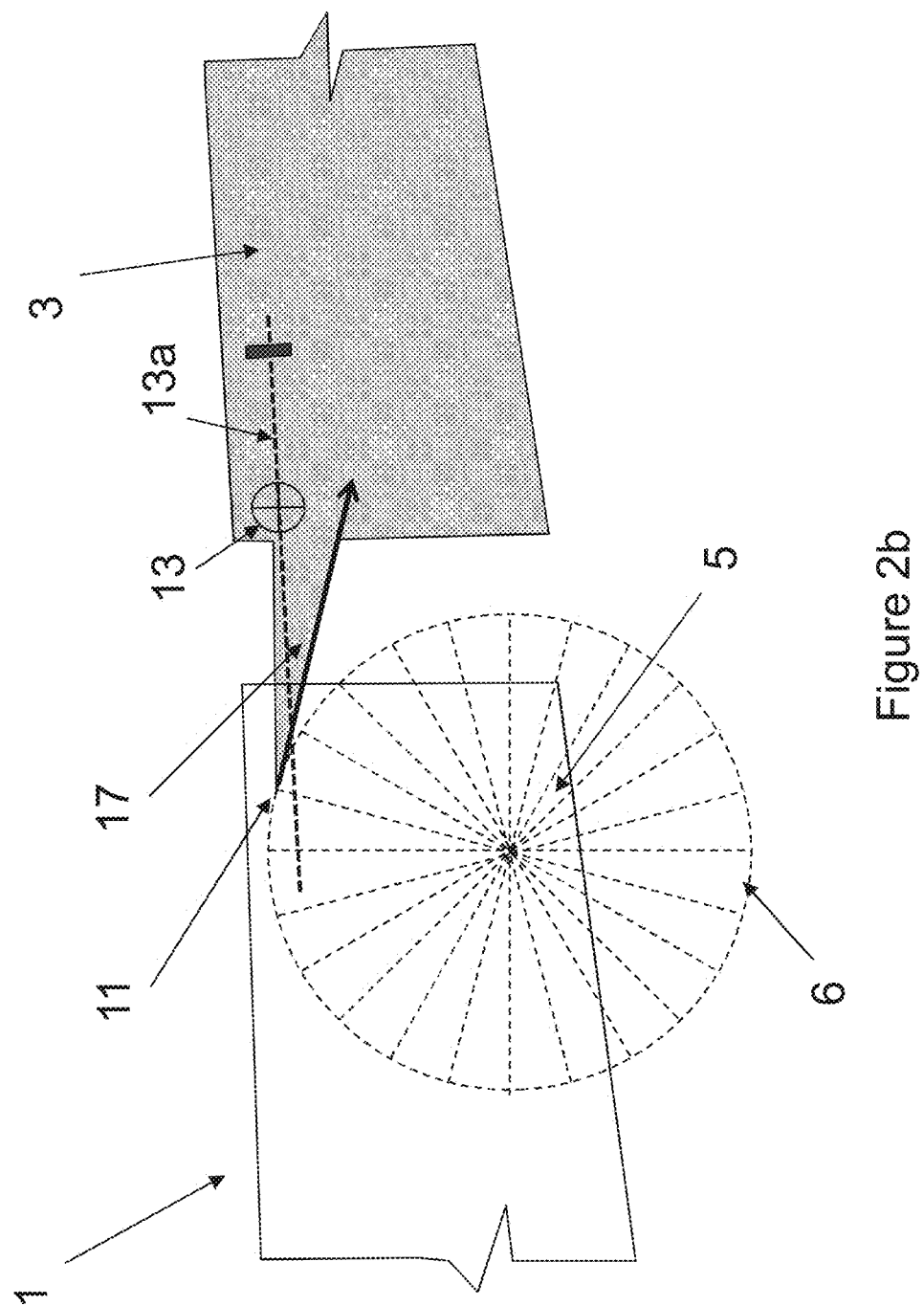

FIG. 1a shows a schematic side view of a wing 1 and wing tip device 3 according to a first embodiment of the invention. The wing tip device 3 is in the form of a planar wing tip extension, but for the sake of clarity only the root portion of the wing tip extension is shown in FIG. 1a. The wing 1 and wing tip device 3 are on the aircraft 2 shown in FIG. 1c.

A rotary actuator 5 is housed in the wing 1 and comprises a motor 7 arranged to rotate a fixed-length link 9. The link 9 is coupled, at its distal end, to the wing tip device 3 at coupling 11. As will become apparent with reference to FIGS. 2a-h, the coupling 11 is an actuated location on the wing tip device 3, which follows an arcuate locus 6 of constant radius as the actuator 5 effects movement of the wing tip device 3. The arcuate locus is shown in dotted lines in FIGS. 1a, and 2a-2i.

The wing tip device 3 is rotatable about a pivot 13. The locus 13a of the pivot 13, as the wing tip device 3 moves away from the flight configuration of FIG. 1a, is shown by a dashed-line. This aspect of the embodiment is described in more detail with reference to FIGS. 2a-2i.

FIG. 1b shows a close-up view of the area within the dashed-square in FIG. 1a. As shown in FIG. 1b, a carriage 14 is arranged to carry the wing tip device 3 on the pivot 13. The carriage 14 is moveable along a carriage guide in the form of track assembly 15. The track assembly 15 is not shown in FIGS. 2a to 3j but mirrors the locus 13a of the pivot 13 (the carriage 14 ensures that there is a constant spacing between the track assembly 15 and the pivot 13). The track assembly 15 is attached to the wing 1, and fixed relative thereto. As will be appreciated when looking at the locus 13a of the pivot 13, the track assembly 15 in the first embodiment of the invention, comprises a substantially straight track extending away from the wing tip and generally parallel to the plane of the wing 1.

The wing tip device 3 is moveable from a flight configuration (shown in FIGS. 1a and 2a) to a ground configuration (shown in FIG. 2i). In the ground configuration, the wing tip device 3 is moved such that the span of the aircraft is reduced (relative to the flight configuration). This enables the aircraft to have a relatively large span during flight, whilst still complying with airport gate limits, safe taxiway usage etc., on the ground.

FIGS. 2a to 2i show the wing tip device 3 during movement from the flight configuration to the ground configuration, as well as the movement of the actuator 5, and the locus 13a of the pivot 13. Reference to these figures will now be made:

In FIG. 2a the wing tip device 3 is in the flight configuration. Accordingly, the upper and lower surfaces, and the leading and trailing edges, of the wing tip device 3 and the wing 1, are continuations of one another. A sealing arrangement (not shown) is also present between the lower surfaces of the wing 1 and wing tip device 3, to prevent any leakage flow during use. The wing tip device 3 is locked in position on the wing 1 via a series of spigots (also not shown).

When the actuator 5 is activated, it exerts an actuation force vector 17 at the coupling 11. The actuation force vector 17 is tangential to the arcuate locus (i.e. perpendicular to the radial link 9 (not shown in FIGS. 2a-2i). As is apparent from FIG. 2a, during an initial phase of motion, starting from the flight configuration, the force vector 17 is in line with the pivot 13. There is therefore no turning moment applied to the wing tip device 3 by the actuator 5; instead, the actuator 5 simply pushes the carriage 14 (and hence the wing tip device 3) along the track assembly 15 to the position shown in FIG. 2b. Having this initial phase of movement comprising only a translational movement has been found to be particularly attractive as it enables the wing tip device 3 to clear the sealing arrangement without causing undue wear to the sealing arrangement, and it also enables the wing tip device 3 to be unlocked from the wing 1.

Figure 2C:
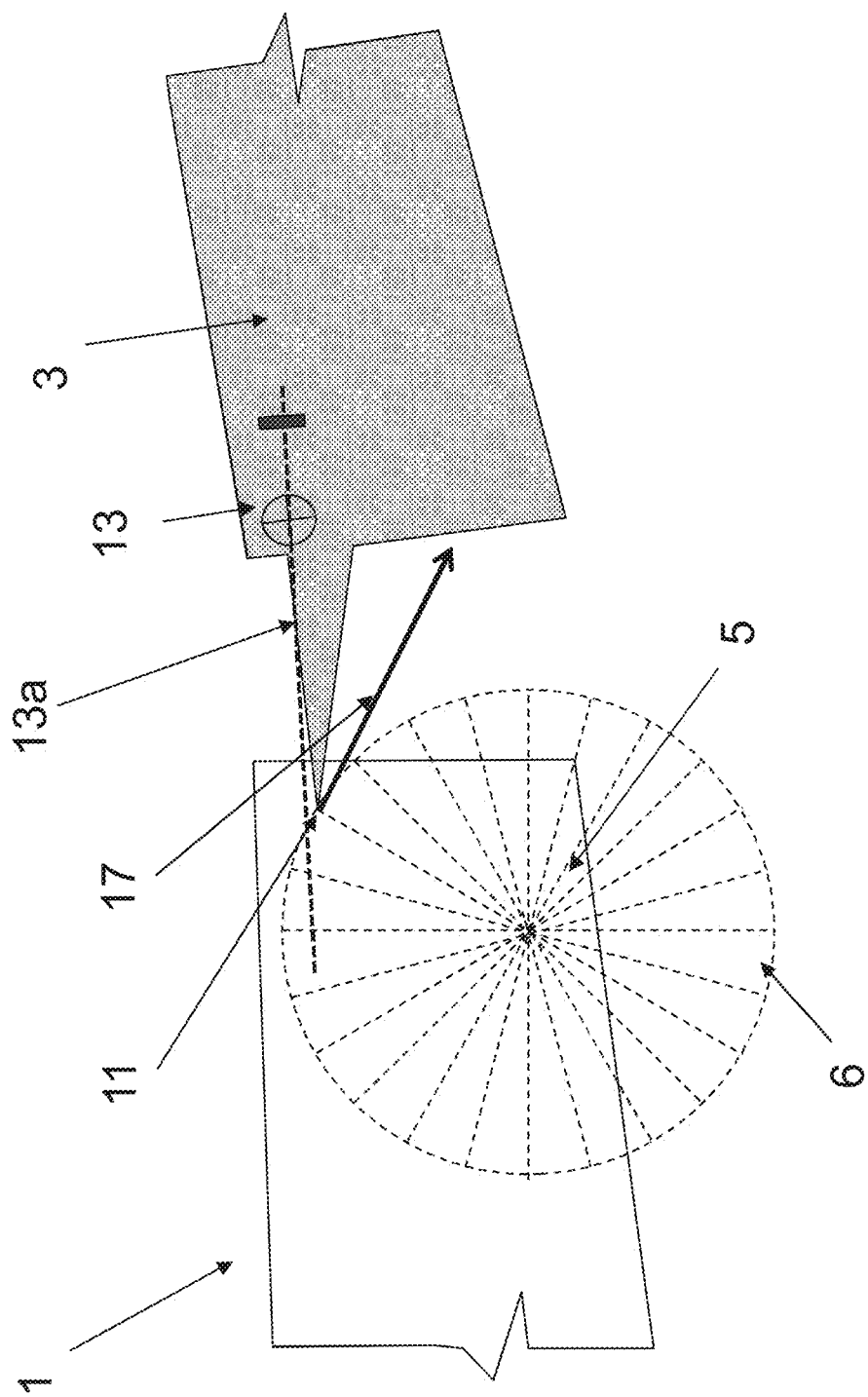
Figure 2D:
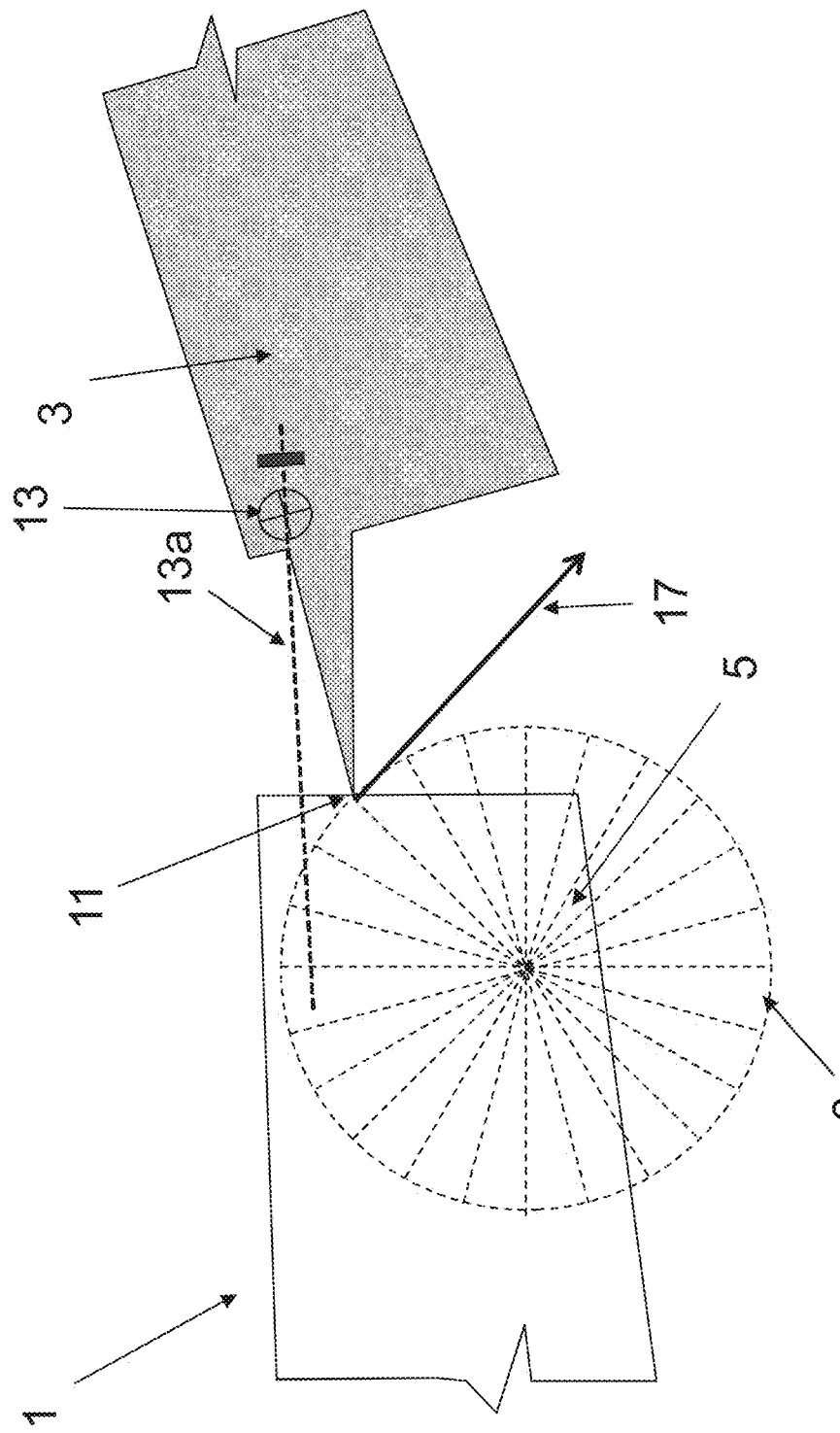
Figure 2E:
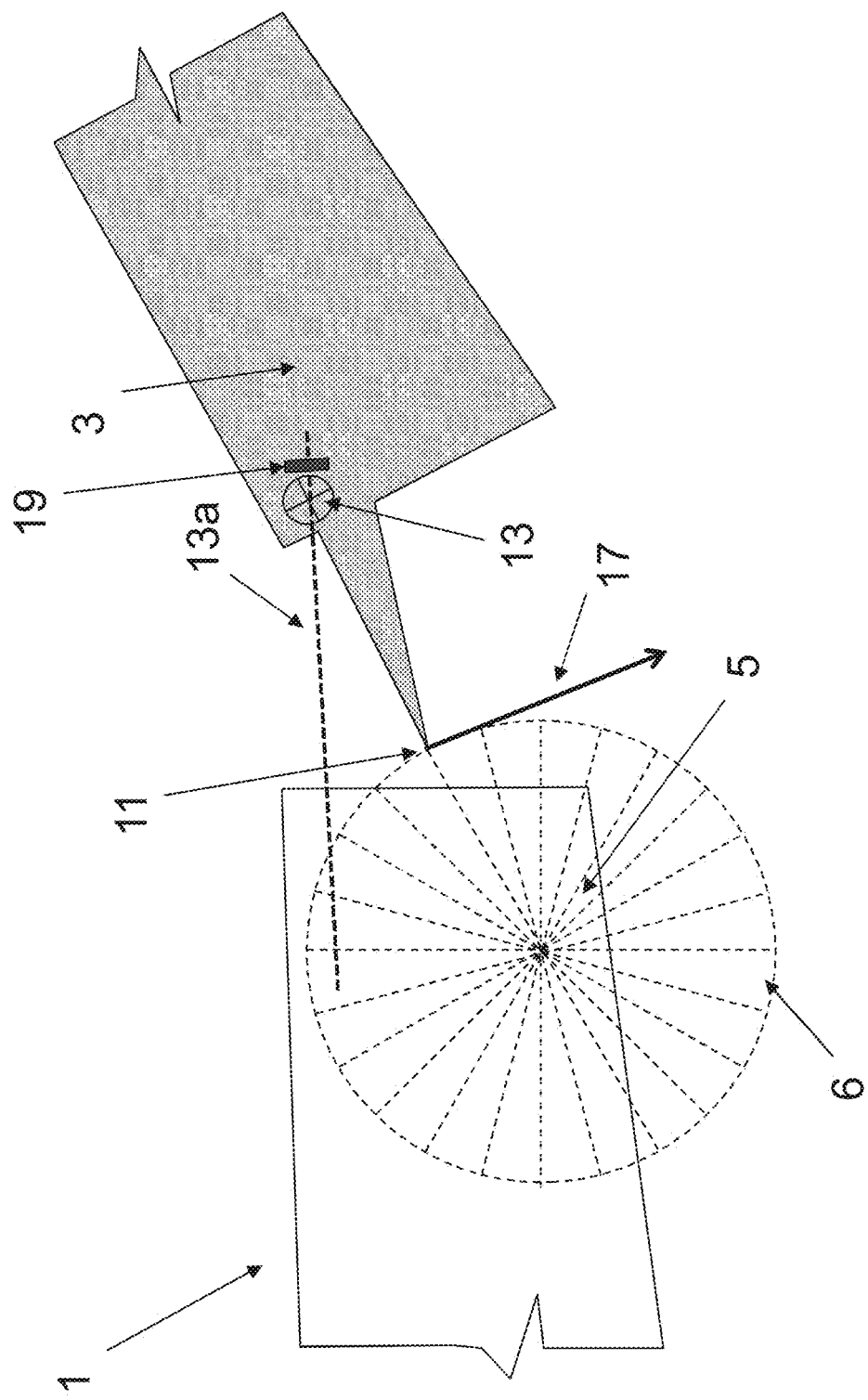

At the position in FIG. 2b, the actuation force vector 17 is no longer in line with the pivot 3. The wing tip device 3 is therefore subjected to a turning moment about the pivot 13 and the wing tip device 3 begins to rotate about that pivot 13 as shown in FIGS. 2c-e. It will be appreciated that as well as the rotation about the pivot 13 (i.e. relative to the carriage 14), the wing tip device 3 continues to also be translated along the track 15. The movement during this phase therefore comprises a combination of both a rotational component and a translational component.

Figure 2F:
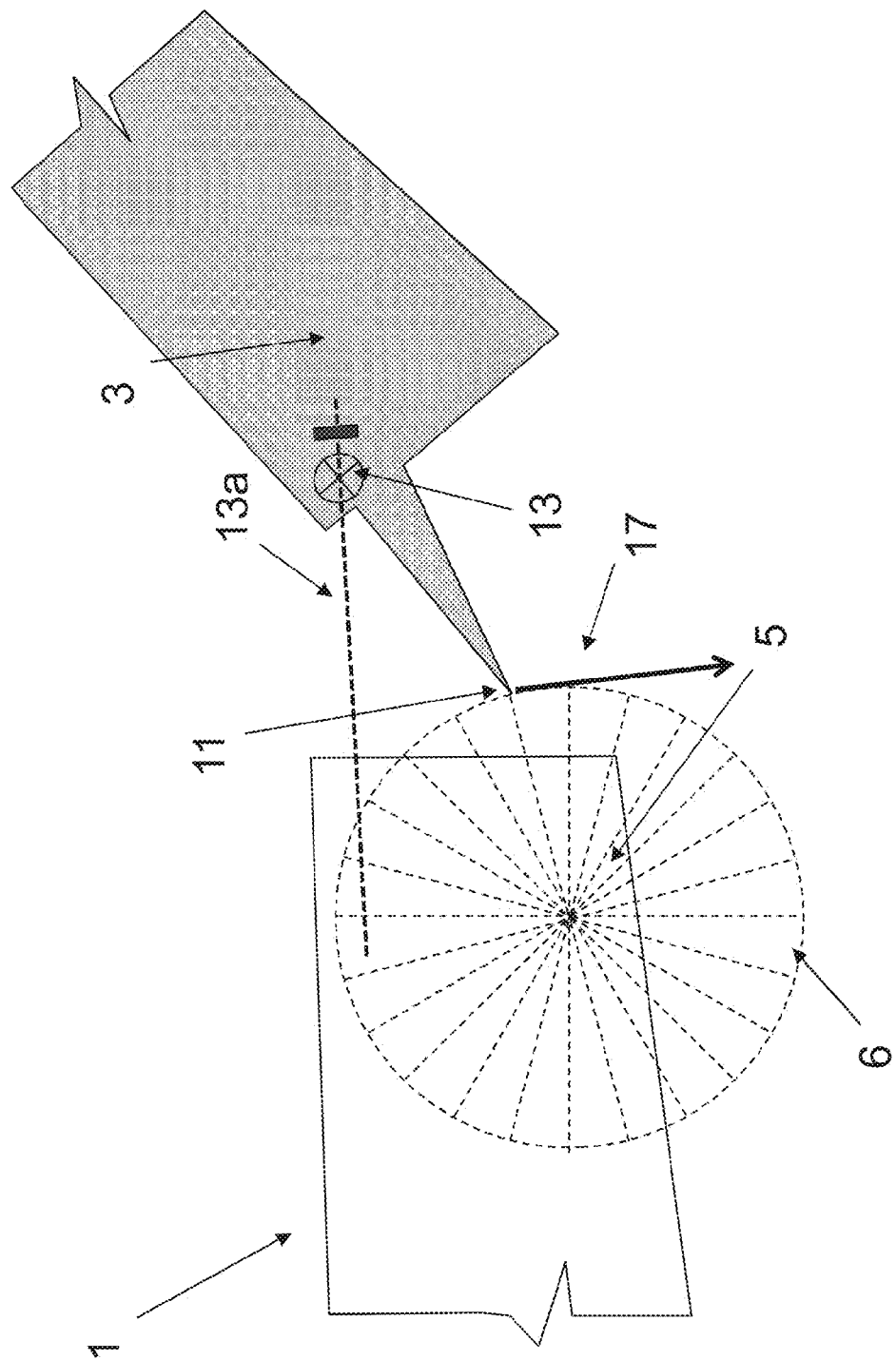

FIG. 2e shows the furthest point of travel of the wing tip device 3 along the rail assembly (a stop 19 is located at the end of the rail as a precaution to prevent any overrunning of the carriage). As the coupling 11 moves further around the locus 6, it begins to pull the wing tip device 3 back along the track assembly 15 (FIGS. 2f-h). The actuation force also continues to cause a rotation of the wing tip device 3 about the pivot 13 during this movement.

The moment arm that rotates the wing tip device 3 gradually decreases as the wing tip device 3 approaches the ground configuration in FIG. 2i. In FIG. 2i, the wing tip device 3, is locked in the ground configuration, and in such a configuration the span of the aircraft is reduced (compared to the flight configuration).

In the first embodiment of the invention the arcuate radius 6, the shape of the track assembly 15 and the relative locations of the coupling 11 and pivot 13, are such that the moment arm reduces to substantially zero when the wing tip device 3 is in the ground configuration. Thus, if an external force were applied to rotate the wing tip device 3 about the pivot 13 (for example as may occur from a cross-wind and demonstrated by the large arrow 21 in FIG. 2i), the reaction force at the coupling 11 (shown by the dashed-arrow 23 in FIG. 2i) is substantially in line with the radial link 9. There is therefore minimal force seeking to back-drive the actuator 5, which is attractive from a safety perspective.

In the first embodiment of the invention, the wing tip device accelerates relatively quickly during the final phase of motion towards the ground configuration (FIG. 2i). The aircraft therefore comprises a damping arrangement (not shown) to control the acceleration and prevent any excessive inertial loads being generated.

It will be appreciated from the above-description that the first embodiment facilitates an 'out and up' movement of the wing tip device, whilst still using rotary actuator. The use of a carriage moveable along a track, such that the wing tip device is rotatable relative to the carriage, enables the use of such an actuator (which may be relatively compact and lightweight), whilst still enabling this relatively complex, 'out-and-up', movement.

Movement from the ground configuration to the flight configuration is the reverse of the above-mentioned movement.

FIGS. 3a to 3j show a wing and wing tip device according to a second embodiment of the invention. Features in the second embodiment of the invention that correspond to similar features in the first embodiment of the invention, are shown with the same reference numerals as in the first embodiment, but with the addition of the prefix '1' (or '10' where appropriate). The embodiment in FIGS. 3a to 3j is the same as that in FIGS. 2a-2i except for the differences described below.

Firstly, rather than a planar wing tip extension, the wing tip device of the second embodiment of the invention is an upwardly extending winglet 103. For clarity, only the root portion of the wing tip device 103 is shown in the Figures.

Figure 3A:
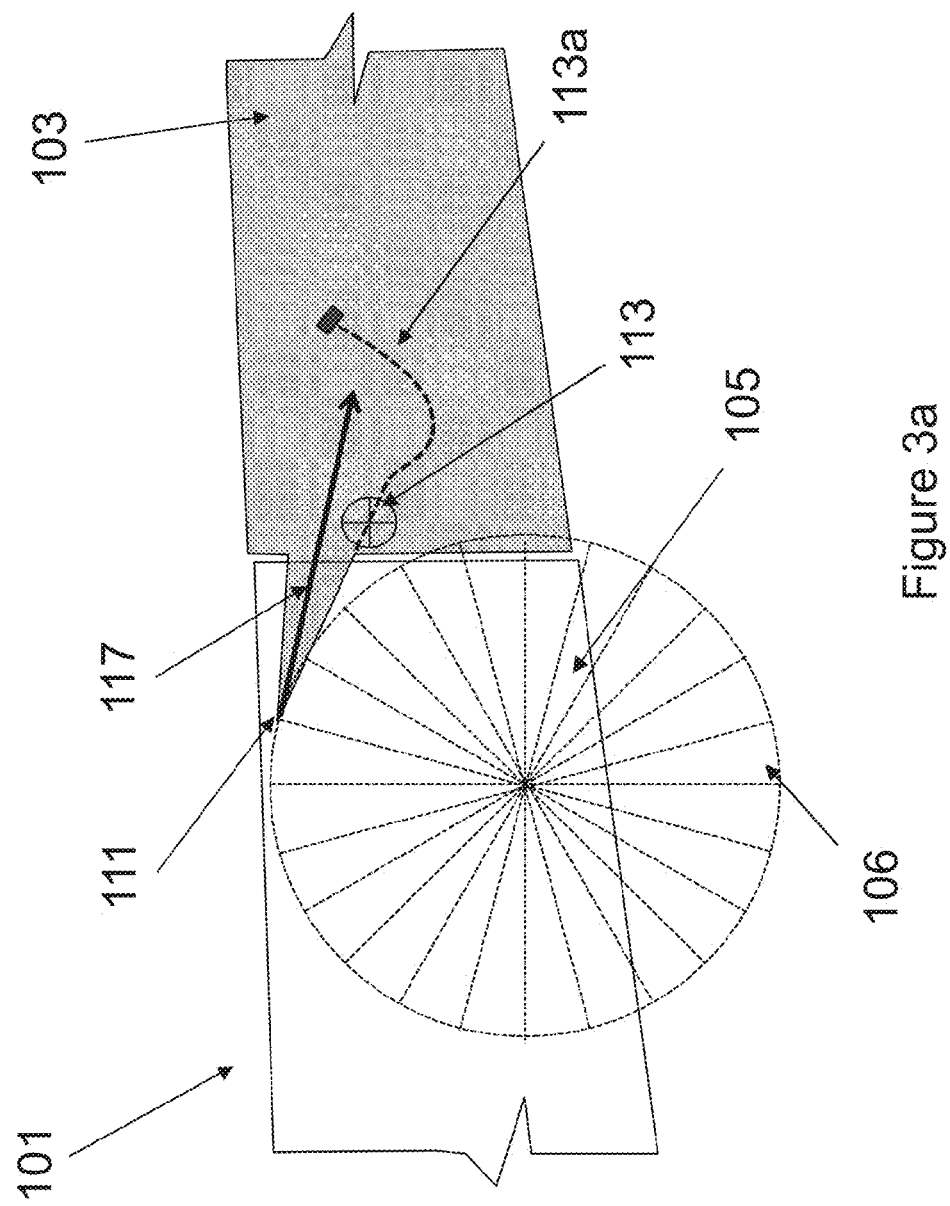
Figure 3B:
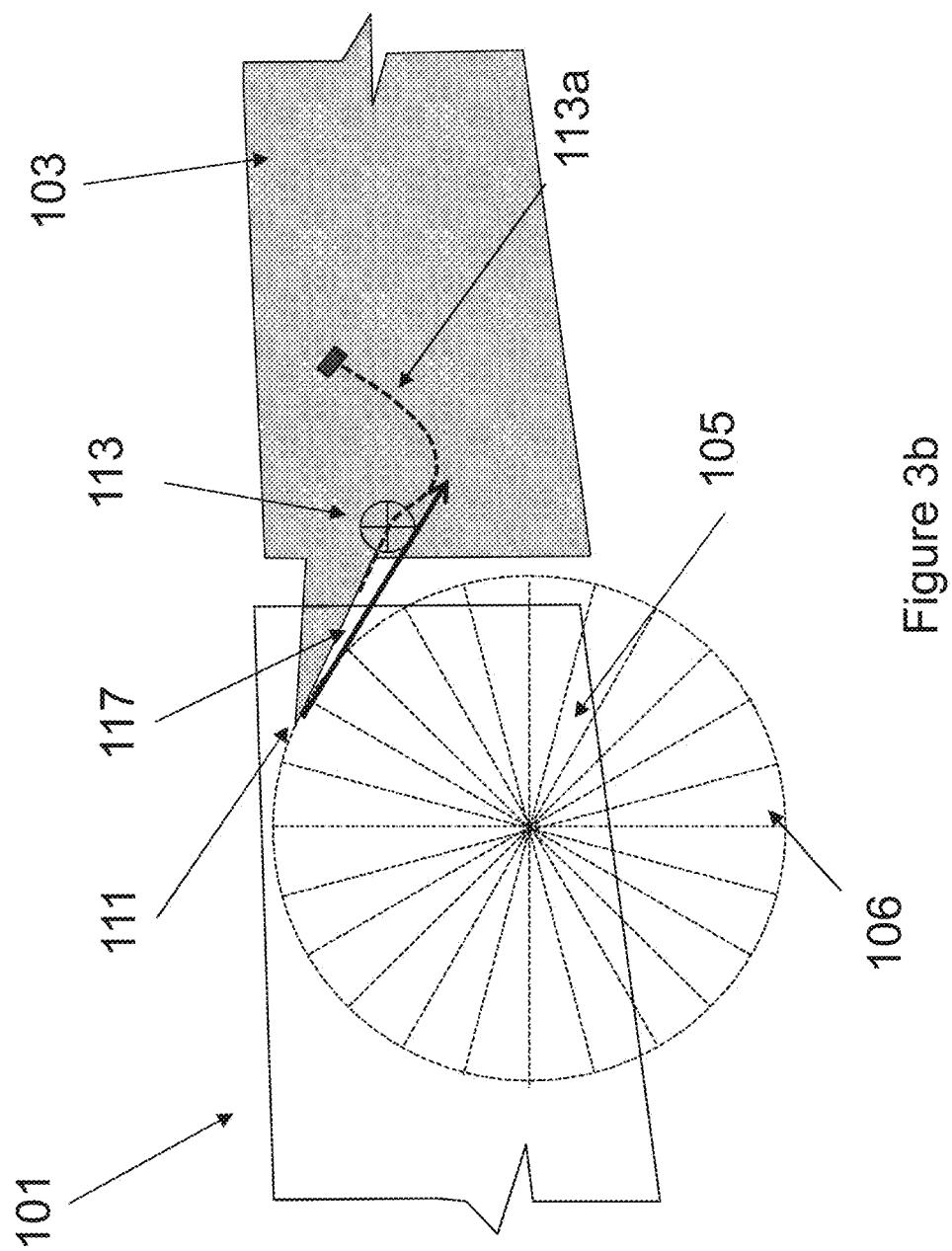

Secondly, the track assembly 115 (which mirrors the shape of the locus 113a) has a curved region, rather than being substantially straight along its length. This shape of track, together with the relative positions of the coupling 111 and the pivot 113, is particularly advantageous for the reasons set out below:

The start of the track (closest to the wing tip) comprises a straight portion inclined downwardly from the plane of the wing 101. As shown in FIGS. 3a and 3b, during the initial phase of motion away from the flight configuration (FIG. 3a) the wing tip device 103 translates along this straight portion. This translation has been found to be especially useful in terms of preserving the life of the sealing arrangement and in unlocking the wing tip device 103 from the wing 101. The wing tip device 103 is also constrained to move within a straight channel (not shown) in the wing 101, to ensure this motion; the actuation force vector 117 does not pass directly through the pivot 113 during this motion, so there is a moment urging the wing tip device 103 to rotate. However, the force vector 117 is sufficiently close to the pivot 113 that the adverse moment is relatively small and can be reacted in the wing structure.

Figure 3C:
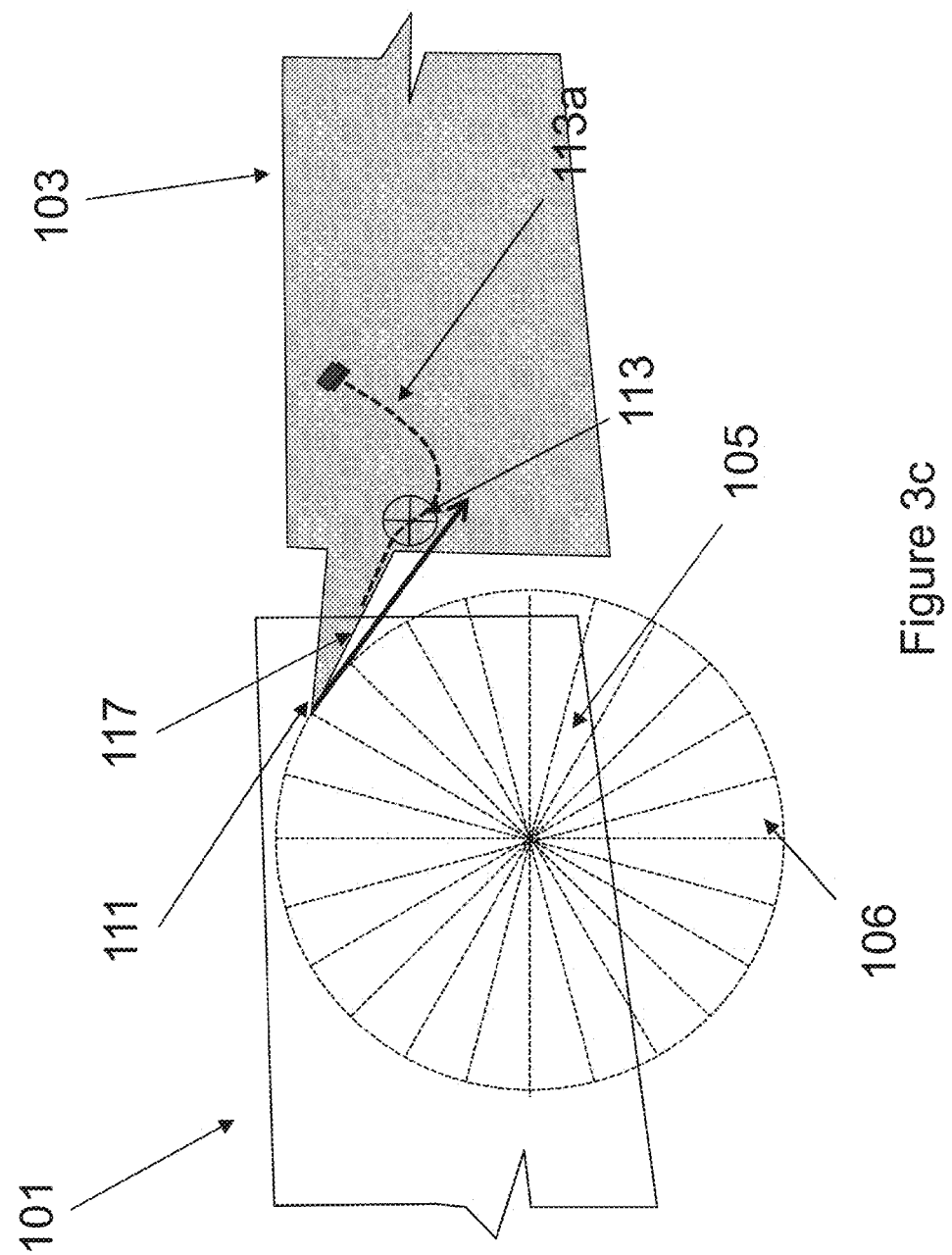
Figure 3D:
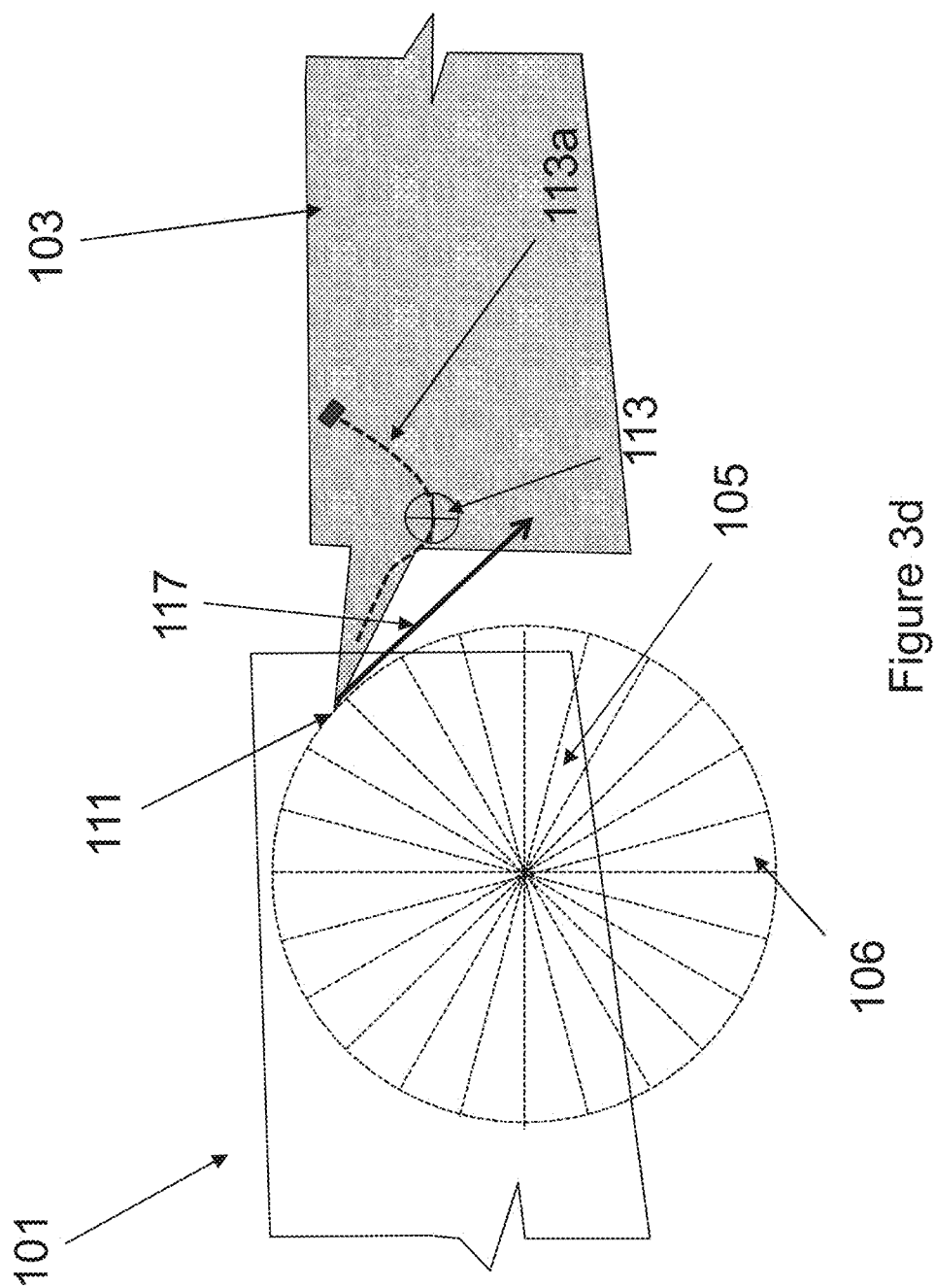
Figure 3E:
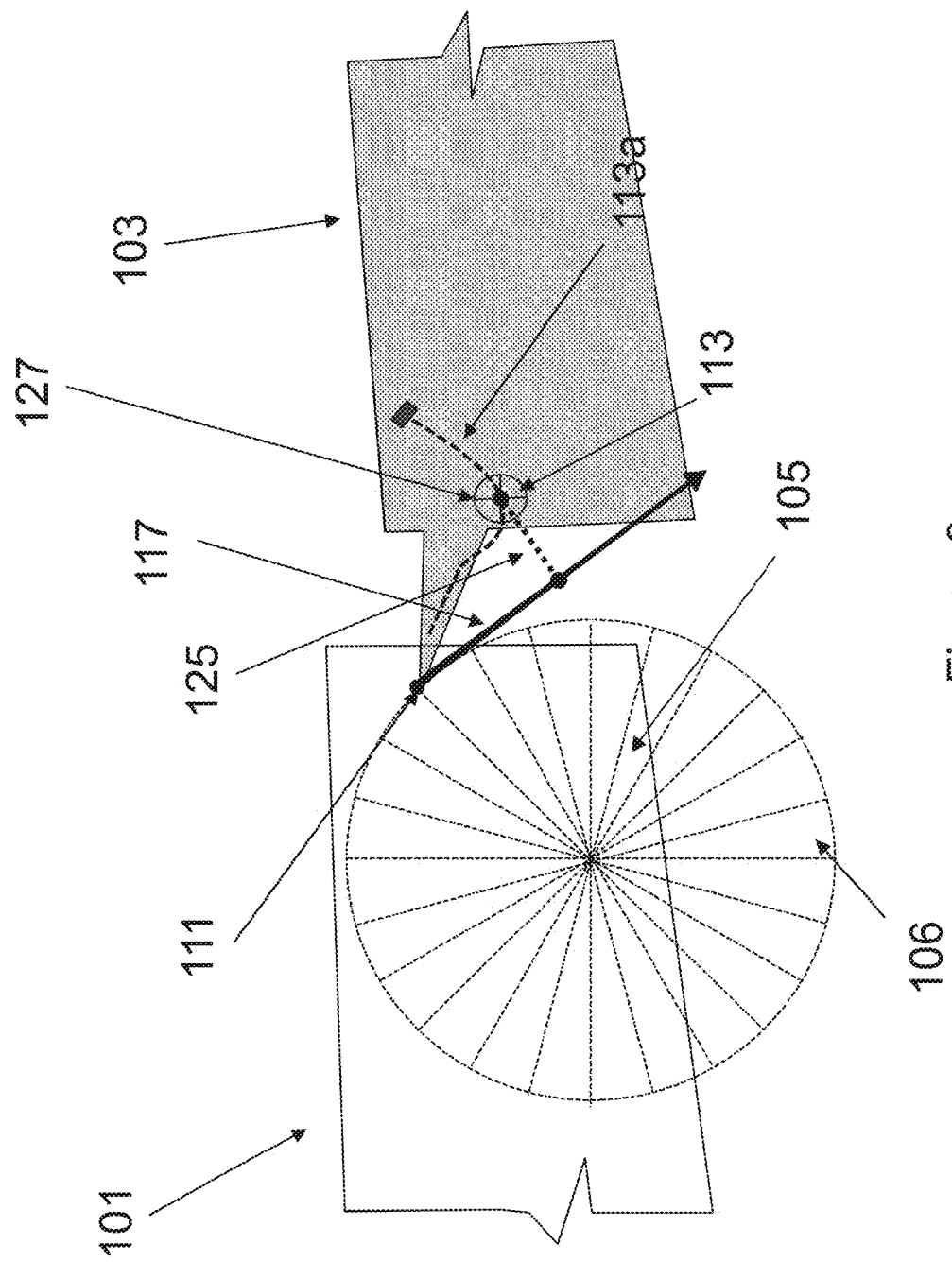
Figure 3F:
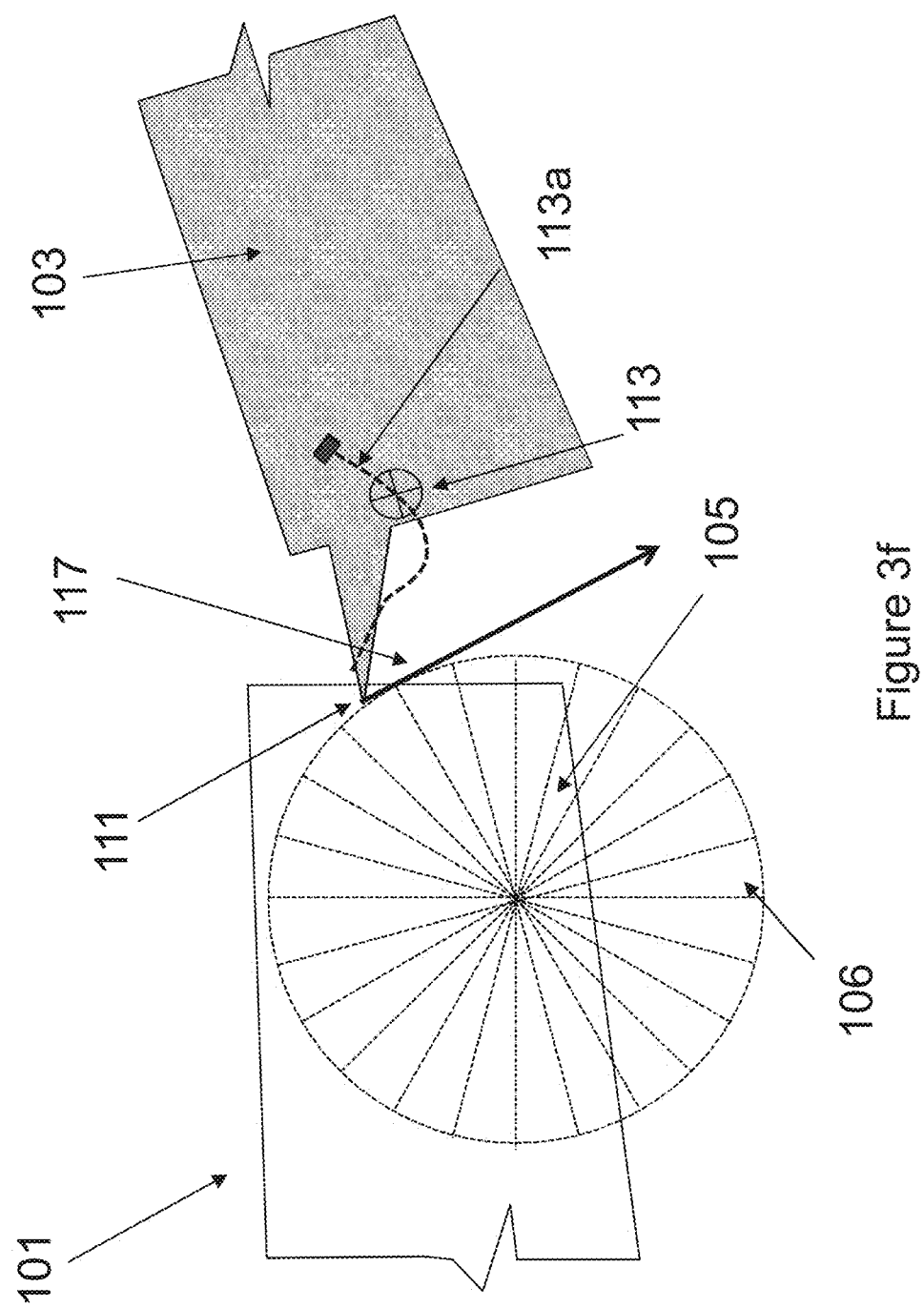
Figure 3G:
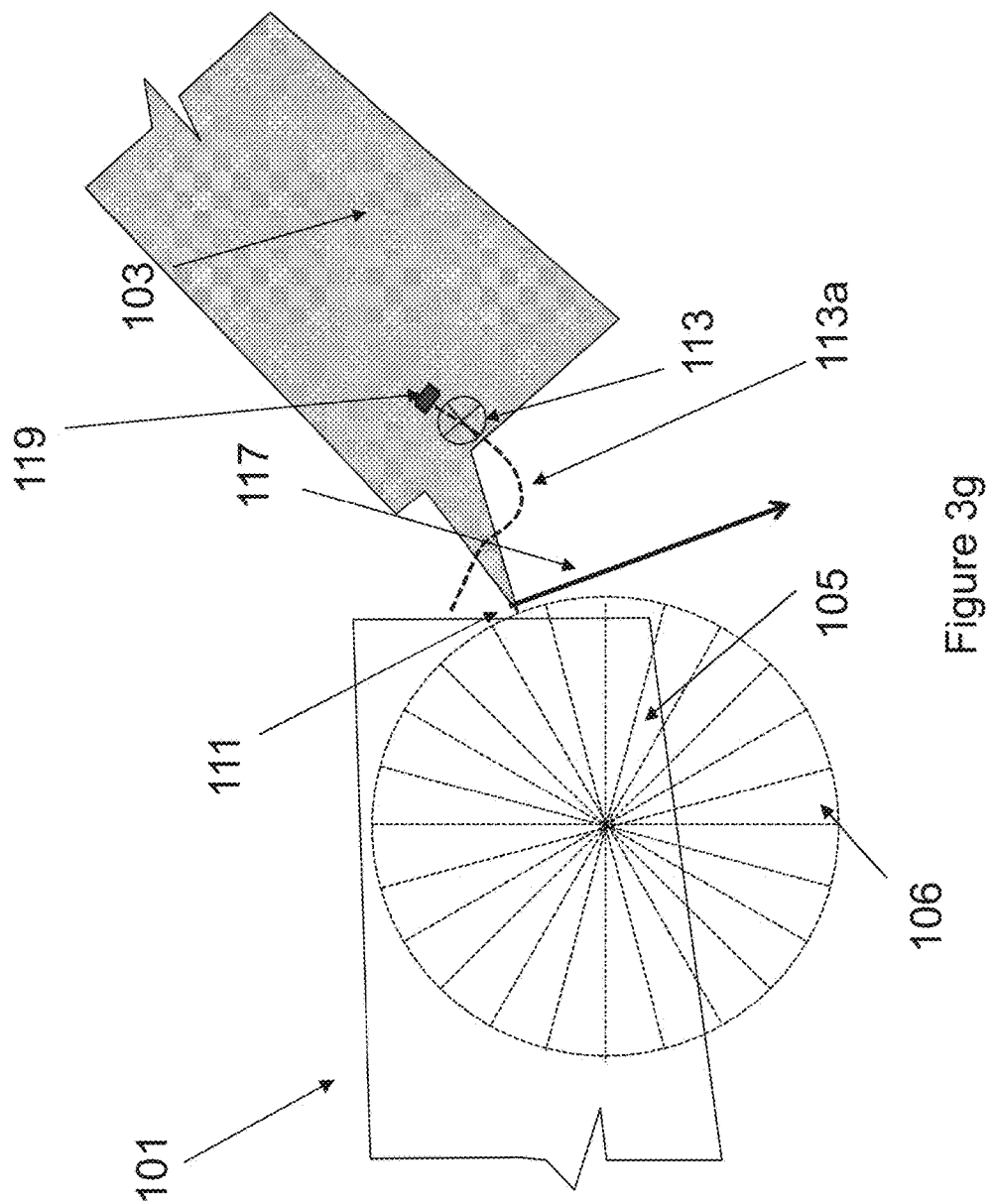

Referring now to FIG. 3c, once the carriage (not shown in FIGS. 3a to 3j) reaches the end of the straight portion of the track assembly, it encounters a U-shaped bend. The wing tip device 103 initially drops (FIGS. 3c-d) until it reaches a local minimum in the bend 127 (FIG. 3e).

Beyond the local minimum 127 in the track, the actuator 105 needs to work against the weight of the wing tip device 103 to move it along the track. However, in the second embodiment of the invention, the relative locations of the pivot 113 and coupling 111 are such that, at this local minimum 127, there is a relatively large moment arm 125 to assist the rotation of the wing tip device about the pivot 113.

Figure 3H:
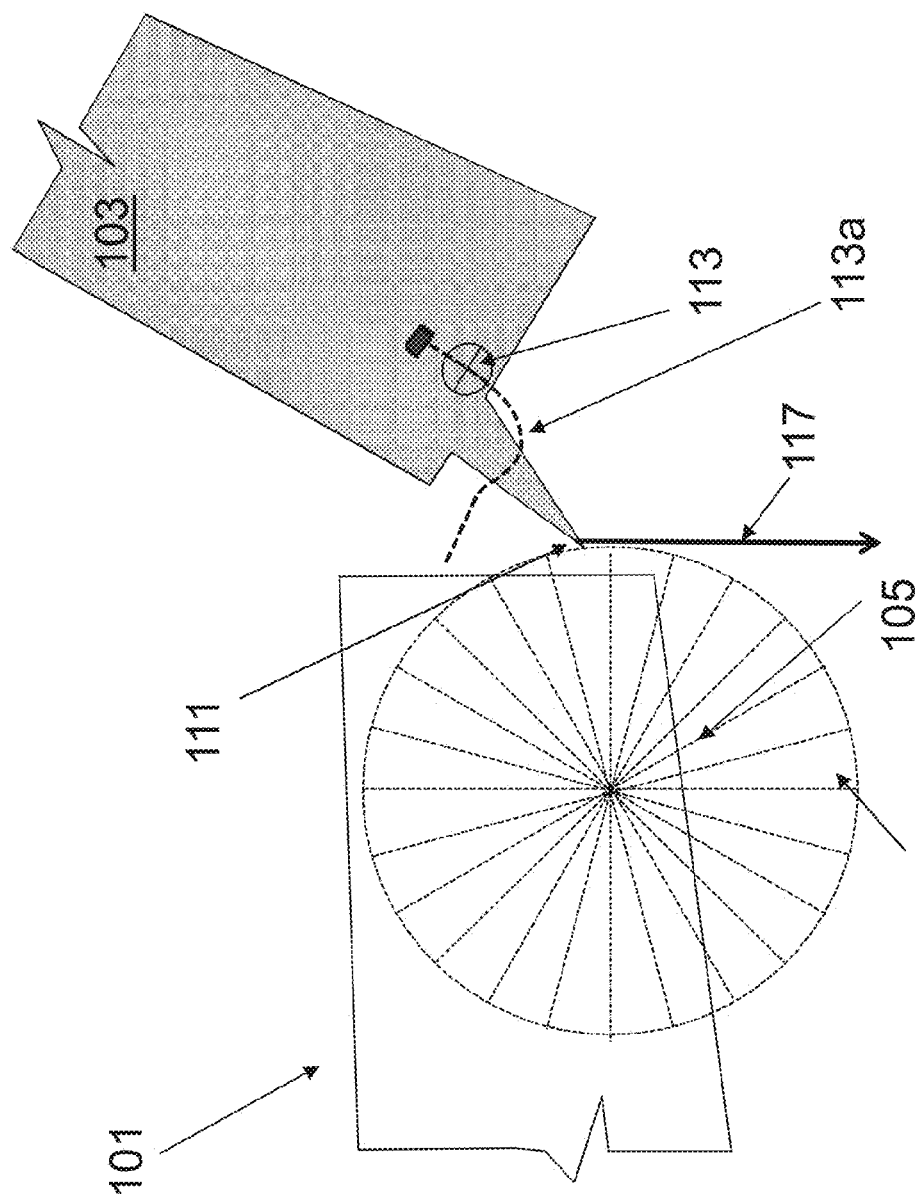

Further rotation of the actuator 105, moves the carriage, and hence the wing tip device 103, further along the track (see FIGS. 3f-g) until it reaches the stop 119. At this point, further rotation of the actuator drags the carriage (hence wing tip device 103) back along the track until it reaches the minimum 127 again (FIGS. 3h-j).

Figure 3J:
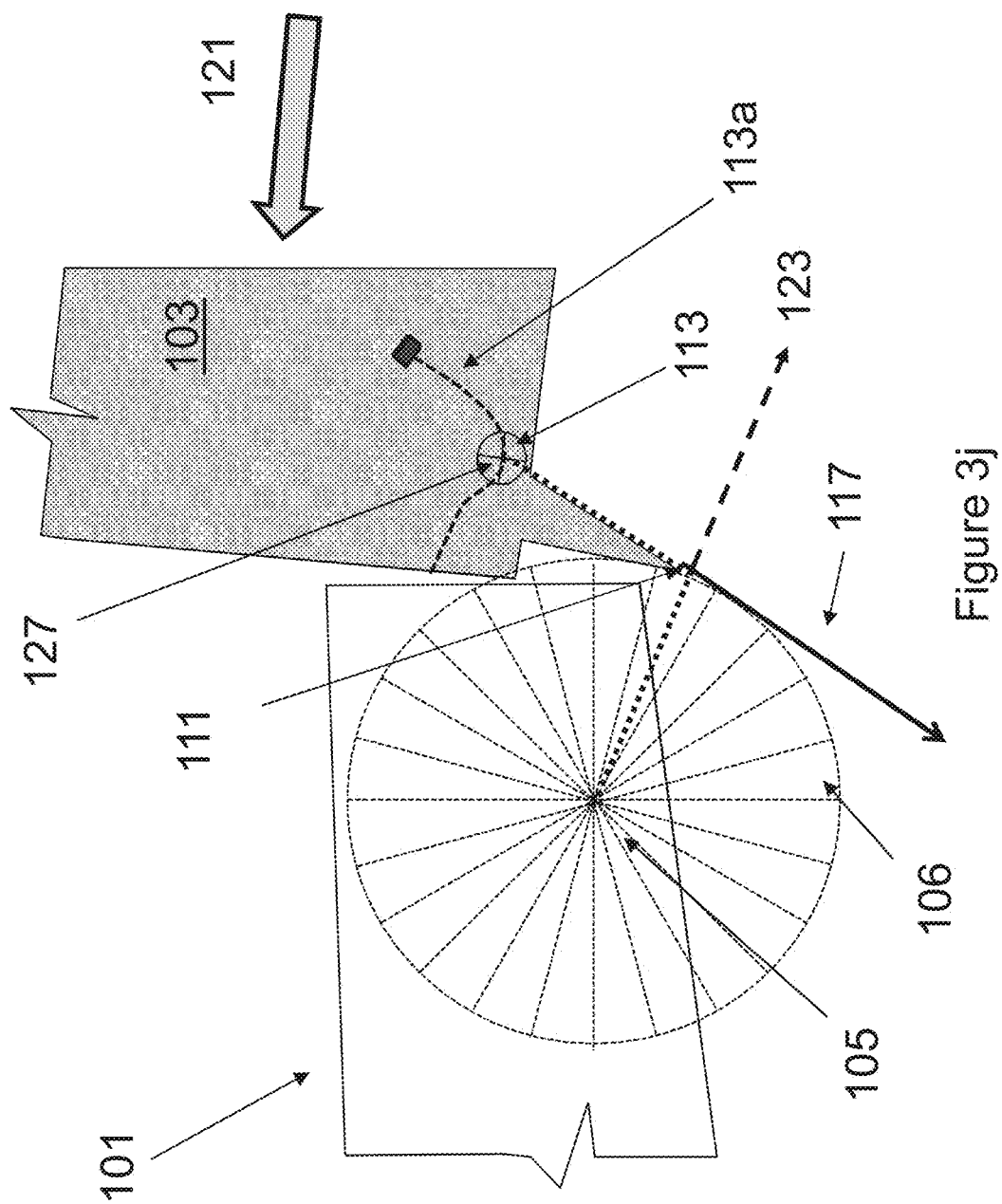

In FIG. 3j, the wing tip device 103 has reached the ground configuration. Having the pivot 113 located in the local minimum 127, when in the ground configuration, is especially beneficial because it ensures that any further translation of the wing tip device 103 along the track assembly, will necessitate a lifting of the wing tip device. The weight of the wing tip device 103 therefore acts to resist any movements away from the ground configuration. As in the first embodiment of the invention, when the wing tip device is in the ground configuration, the moment arm has also reduced to substantially zero. Thus, if an external force were applied to rotate the wing tip device 103 about the pivot 113 (for example as may occur from a cross-wind and demonstrated by the large arrow 121 in FIG. 3j), the reaction force at the coupling 111 (shown by the dashed-arrow 123 in FIG. 3j) is substantially in line with the radial link. There is therefore minimal force seeking to back-drive the actuator 105, which is attractive from a safety perspective.

Whilst the present invention has been described and illustrated with reference to particular embodiments, it will be appreciated by those of ordinary skill in the art that the invention lends itself to many different variations not specifically illustrated herein. By way of example only, certain possible variations will now be described. A winglet may be used with the arrangement in the first embodiment of the invention, and a wing tip extension may be used with the arrangement in the second embodiment of the invention. In some embodiments, the locus of the actuated location may be curved, and not necessarily an arcuate shape having a constant radius. In the above-described embodiments the carriage guide is a track assembly. However, in other embodiments the carriage guide may take alternative forms, such as a slot, or groove for receiving a carriage.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing having a span, a wing tip device at the tip of the wing and an actuator, wherein the actuator is arranged to effect movement of the wing tip device between:
   (i) a flight configuration for use during flight and
   (ii) a ground configuration for use during ground-based operations, in which ground configuration the wing tip device is moved away from the flight configuration such that the span of the aircraft wing is reduced, characterised in that the aircraft comprises:
      a carriage guide, fixed relative to the wing, and
      a carriage arranged to move along the carriage guide as the wing tip device moves between the flight and ground configurations,
   wherein the carriage carries the wing tip device on a pivot, such that the wing tip device is rotatable relative to the carriage, about the pivot, as the carriage moves along the carriage guide
   the movement of the wing tip device, between the flight and the ground configurations, comprising both a rotational component of movement of the wing tip device about the pivot, and a translational component of movement, of the pivot, along the carriage guide.

2. The aircraft according to claim 1, wherein the actuator is coupled to the wing tip device at a coupling, and the actuator is arranged such that the coupling, during movement of the wing tip device between the flight configuration and the ground configuration, follows a substantially arcuate locus.

3. The aircraft according to claim 2, wherein the relative locations of the pivot and the coupling, when the wing tip device is in the ground configuration, are such that when the wing tip device is urged to undergo a rotation about the pivot, from that ground configuration, the reaction force at the coupling is substantially radial with respect to the arcuate locus.

4. The aircraft according to claim 1, wherein the movement from the flight configuration to the ground configuration comprises an initial phase of motion that comprises only a translational component of movement of the wing tip device.

5. The aircraft according to claim 4, wherein the actuator applies an actuation-force vector, and during the initial phase of motion the actuation-force vector and the pivot are substantially inline such that the actuation force vector passes substantially through, or close to, the pivot.

6. The aircraft according to claim 1, wherein when the wing tip device is in the ground configuration the pivot is located at a height, and the height of the pivot is at a local minimum, such that movement of the carriage along the carriage guide to move the wing tip device away from the ground configuration will result in the lifting of the pivot.

7. An assembly for attaching a wing tip device to an aircraft wing, wherein the wing tip device is moveable between:
   (i) a flight configuration for use during flight and
   (ii) a ground configuration for use during ground-based operations, in which ground configuration the wing tip device is moved away from the flight configuration such that the span of the aircraft is reduced,
   wherein the assembly comprises:
      a carriage guide, for fixing relative to the wing, and
      a carriage arranged to move along the carriage guide as the wing tip device moves between the flight and ground configurations,
   wherein the carriage carries the wing tip device on a pivot, such that the wing tip device is rotatable relative to the carriage, about the pivot, as the carriage moves along the carriage guide.

8. A method of designing the path of movement of a wing tip device on the aircraft according to claim 2,
   wherein the method comprises the steps of determining:
      (i) the radius of the arcuate locus, and/or
      (ii) the shape of the carriage guide and/or
      (iii) the relative positions of the pivot and the coupling,
   such that as the wing tip device moves along the carriage guide between the flight and the ground configurations, the movement of the wing tip device comprises a translational component of movement along the carriage guide, and rotational component about the pivot.

9. A method of moving a wing tip device between a flight configuration and a ground configuration, wherein the wing tip device is pivotable on a carriage that is movable along a carriage guide, such that the wing tip device is rotatable relative to the carriage,
   wherein the method comprises the step of:
      moving the carriage along the carriage guide, such that the movement of the wing tip device, between the flight and the ground configurations, comprises both a rotational component of movement of the wing tip device about the pivot, and a translational component of movement, of the pivot, along the carriage guide.

* * * * *